United States Patent
Jain et al.

(10) Patent No.: US 10,356,830 B2
(45) Date of Patent: Jul. 16, 2019

(54) SYSTEM AND METHOD TO FACILITATE STATELESS SERVING GATEWAY OPERATIONS IN A NETWORK ENVIRONMENT

(71) Applicant: CISCO TECHNOLOGY, INC., San Jose, CA (US)

(72) Inventors: Paras Mal Jain, Fremont, CA (US); Girish Sivasubramanian, Fremont, CA (US); Yogesh Devidas Patil, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/408,179

(22) Filed: Jan. 17, 2017

(65) Prior Publication Data
US 2018/0206275 A1   Jul. 19, 2018

(51) Int. Cl.
*H04W 4/00* (2018.01)
*H04M 1/66* (2006.01)
(Continued)

(52) U.S. Cl.
CPC .............. *H04W 76/11* (2018.02); *H04L 12/56* (2013.01); *H04L 63/029* (2013.01); *H04L 63/0281* (2013.01); *H04L 63/0807* (2013.01); *H04W 36/0027* (2013.01); *H04W 40/02* (2013.01); *H04W 76/12* (2018.02)

(58) Field of Classification Search
CPC ............................................. H04W 74/02–068
See application file for complete search history.

(56) References Cited

U.S. PATENT DOCUMENTS 6,826,684 B1 * 11/2004 Fink ................... H04L 29/12009
713/160
7,933,253 B2    4/2011  Akram et al.
(Continued)

FOREIGN PATENT DOCUMENTS

EP         2843885 A1      3/2015

OTHER PUBLICATIONS

Wikipedia Contributors, "GPRS Tunnelling Protocol," Wikipedia, The Free Encyclopedia, May 31, 2017, https://en.wikipedia.org/wiki/GPRS_Tunnelling_Protocol.
(Continued)

*Primary Examiner* — San Htun
(74) *Attorney, Agent, or Firm* — Patterson + Sheridan, LLP

(57) ABSTRACT

A method is provided in one example embodiment and may include sharing an access key from a control-plane serving gateway (SGW-C) to a plurality of user-plane serving gateways (SGW-Us); allocating a plurality of Fully Qualified Tunnel Endpoint Identifiers (FQTEIDs) associated with a user equipment (UE) session; generating an access token for the UE session based, at least in part, on the access key and the plurality of FQTEIDs; and appending the access token to user-plane packets for the UE session. The method can further include receiving a data packet for the UE session by a particular SGW-U, wherein the uplink packet is appended with the access token for the UE session; determining FQTEIDs associated with the UAT; and routing the uplink packet from the particular SGW-U based on the FQTEIDs.

16 Claims, 10 Drawing Sheets

(51) Int. Cl.
  *H04W 76/11* (2018.01)
  *H04W 40/02* (2009.01)
  *H04L 29/06* (2006.01)
  *H04L 12/54* (2013.01)
  *H04W 36/00* (2009.01)
  *H04W 76/12* (2018.01)

(56) References Cited

U.S. PATENT DOCUMENTS

| | | | |
|---|---|---|---|
| 9,053,461 B2 | 6/2015 | Vemulapelli et al. | |
| 2007/0041382 A1* | 2/2007 | Vayanos | H04L 63/0428 370/394 |
| 2012/0202491 A1* | 8/2012 | Fox | H04B 7/2609 455/435.1 |
| 2012/0309355 A1* | 12/2012 | Pudney | H04L 63/0853 455/411 |
| 2015/0117408 A1 | 4/2015 | Kedalagudde et al. | |
| 2016/0248682 A1* | 8/2016 | Lee | H04W 12/08 |

OTHER PUBLICATIONS

"GTP—the tunnel," Nokia Siemans Networks, Chapter 5, published on Feb. 22, 2013; 26 pages https://www.slideshare.net/farzad36/chap05-gtp-03kh.

Santosh, D., "LTE: Tunnel Identifiers (GTPv2)," Wired-n-Wireless Blogspot, May 24, 2009, 8 pages; http://wired-n-wireless.blogspot.com/2009/05/lte-tunnel-identifiers-gtpv2.html.

Rabensky, "What is Bit Masking?," Stack Overflow, Jul. 30, 2016, 4 pages; https://stackoverflow.com/questions/10439411/what-is-bit-masking.

"3GPP TS 29.274 V14.2.0 (Dec. 2016) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 14);" 3GPP, 650 Route des Lucioles—Sophia Antipolis, Valbonne—France, Dec. 2016; 369 pages.

"3GPP TS 36.413 V14.0.0 (Sep. 2016) Technical Specification: 3rd Generation Partnership Project; Technical Specification Group Radio Access Network; Evolved Universal Terrestrial Radio Access Network (E-UTRAN); S1 Application Protocol (S1AP) (Release 14)," 3GPP, 650 Route des Lucioles—Sophia Antipolis, Valbonne—France, Sep. 2016; 333 pages.

PCT Notification of Transmittal of the International Search Report and The Written Opinion of the International Searching Authority, or the Declaration for Application No. PCT/US2018/013124 dated Mar. 22, 2018.

PCT Written Opinion of the International Searching Authority for Application No. PCT/US2018/013124 dated Jan. 10, 2018.

* cited by examiner

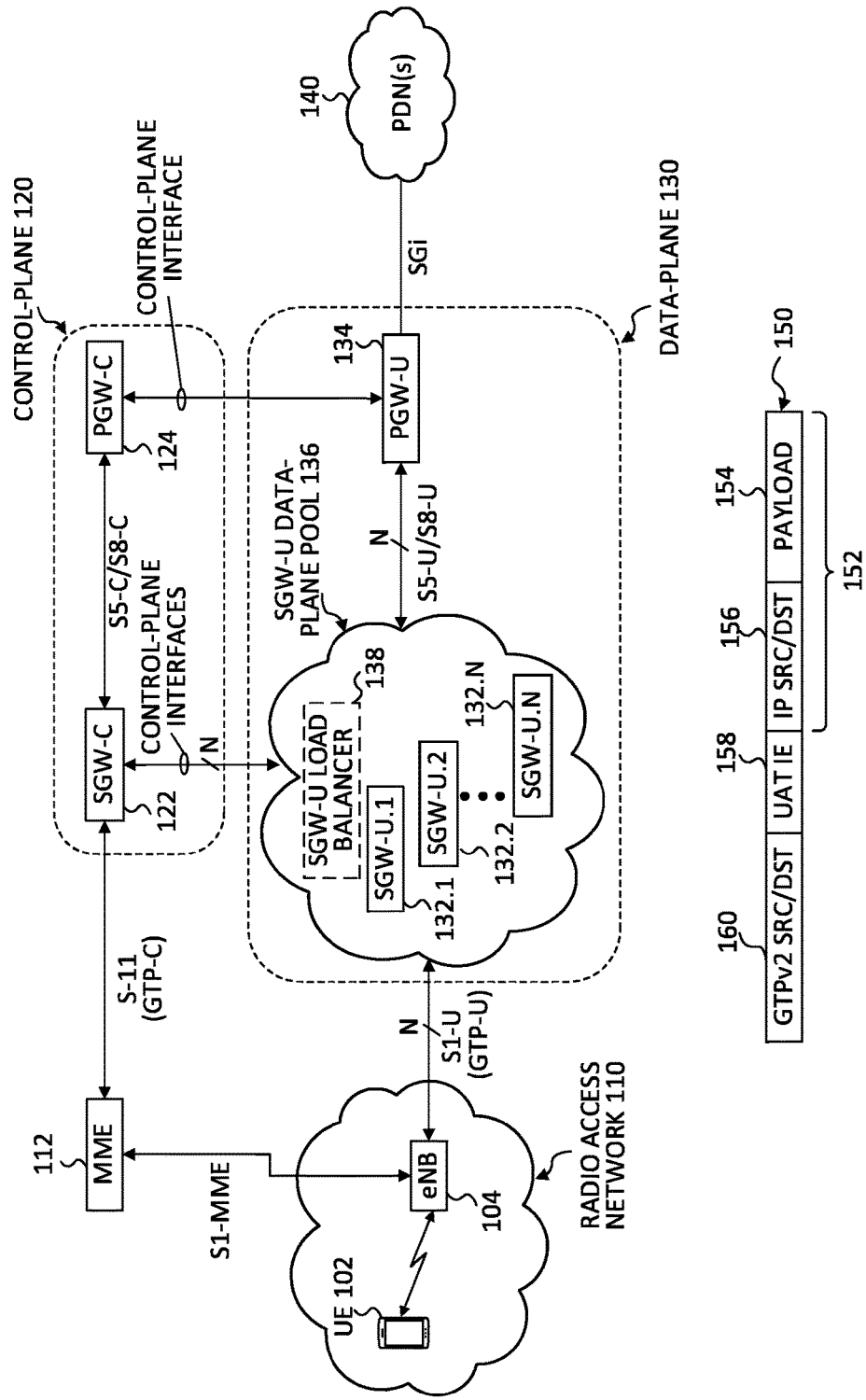

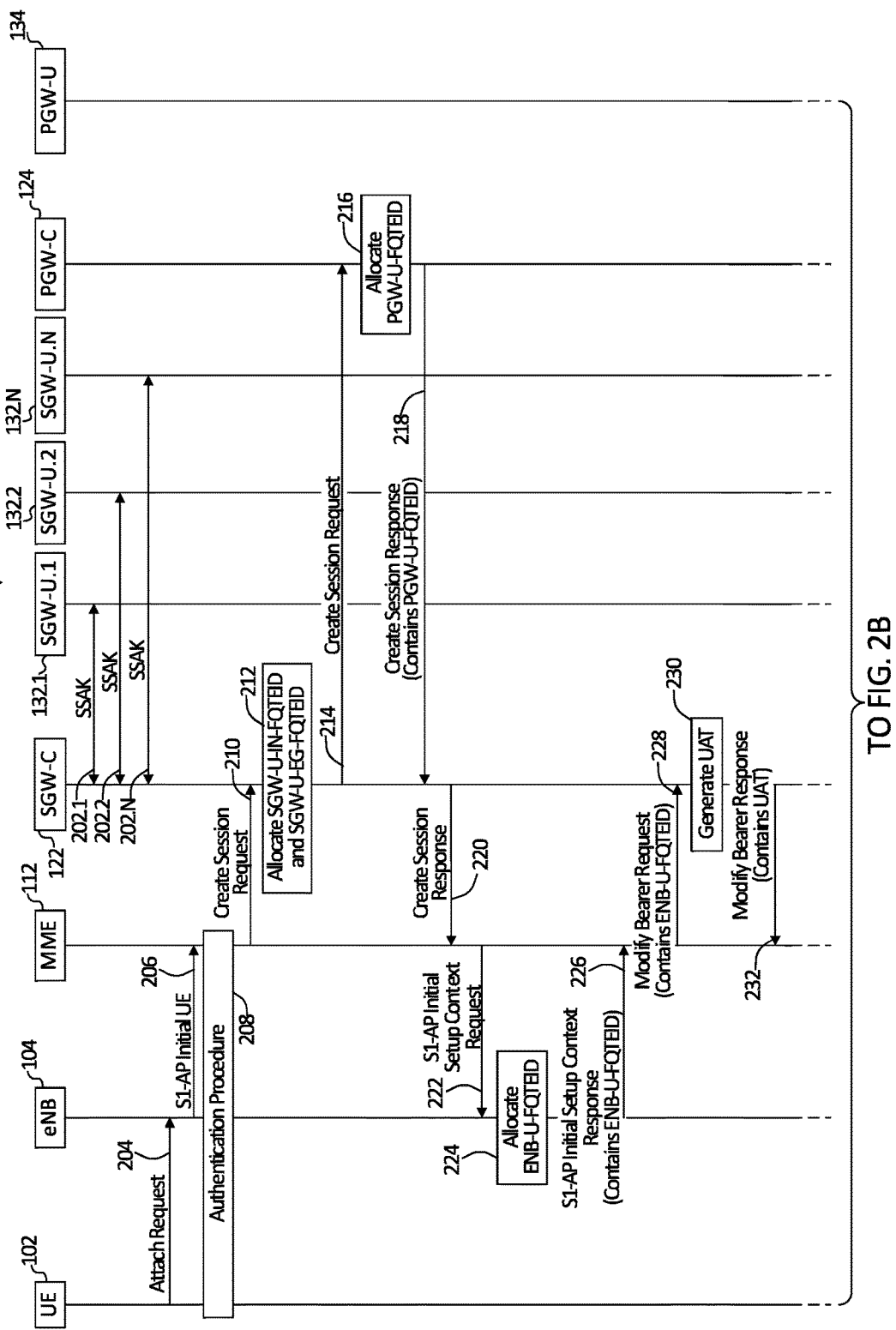

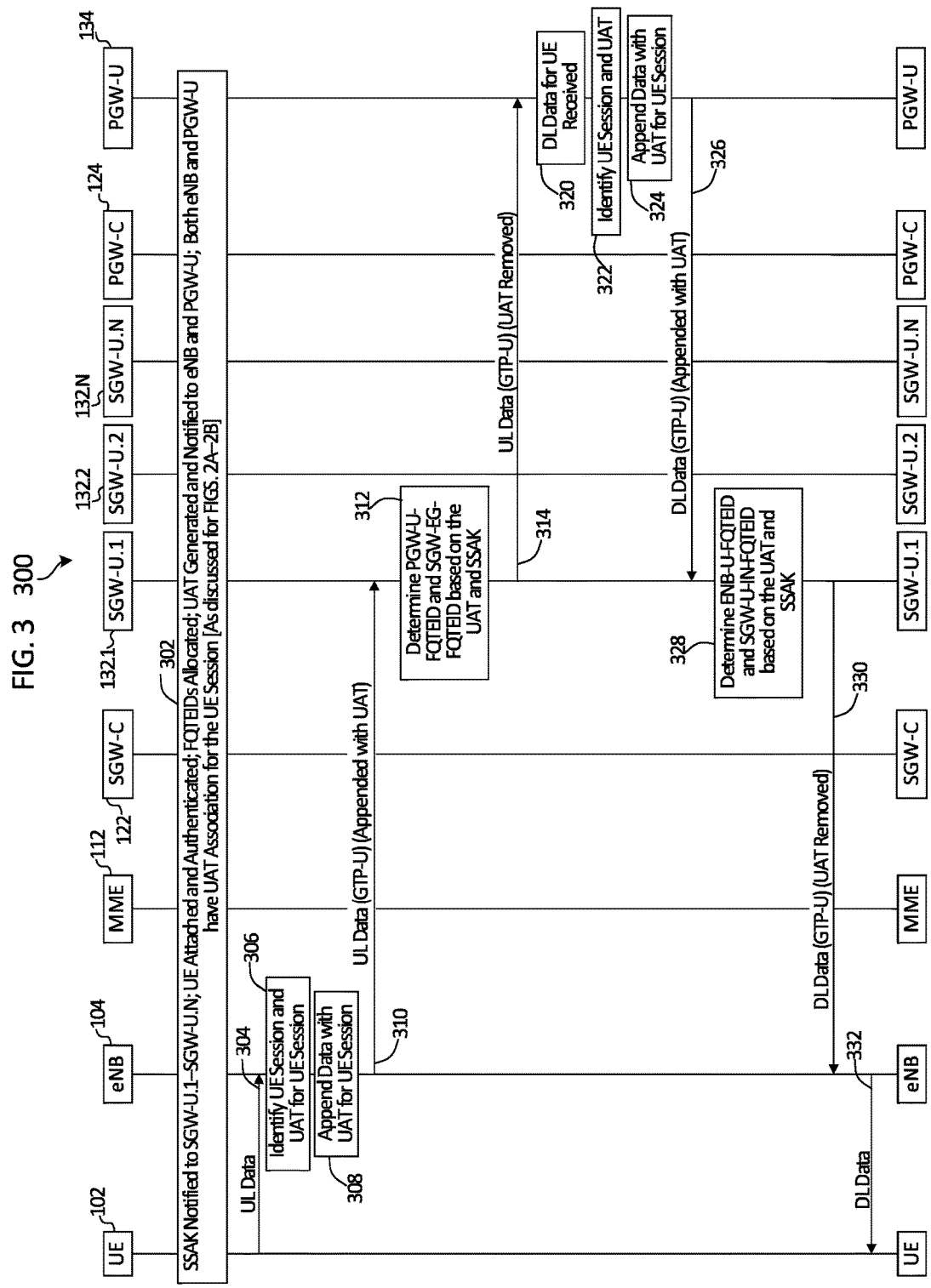

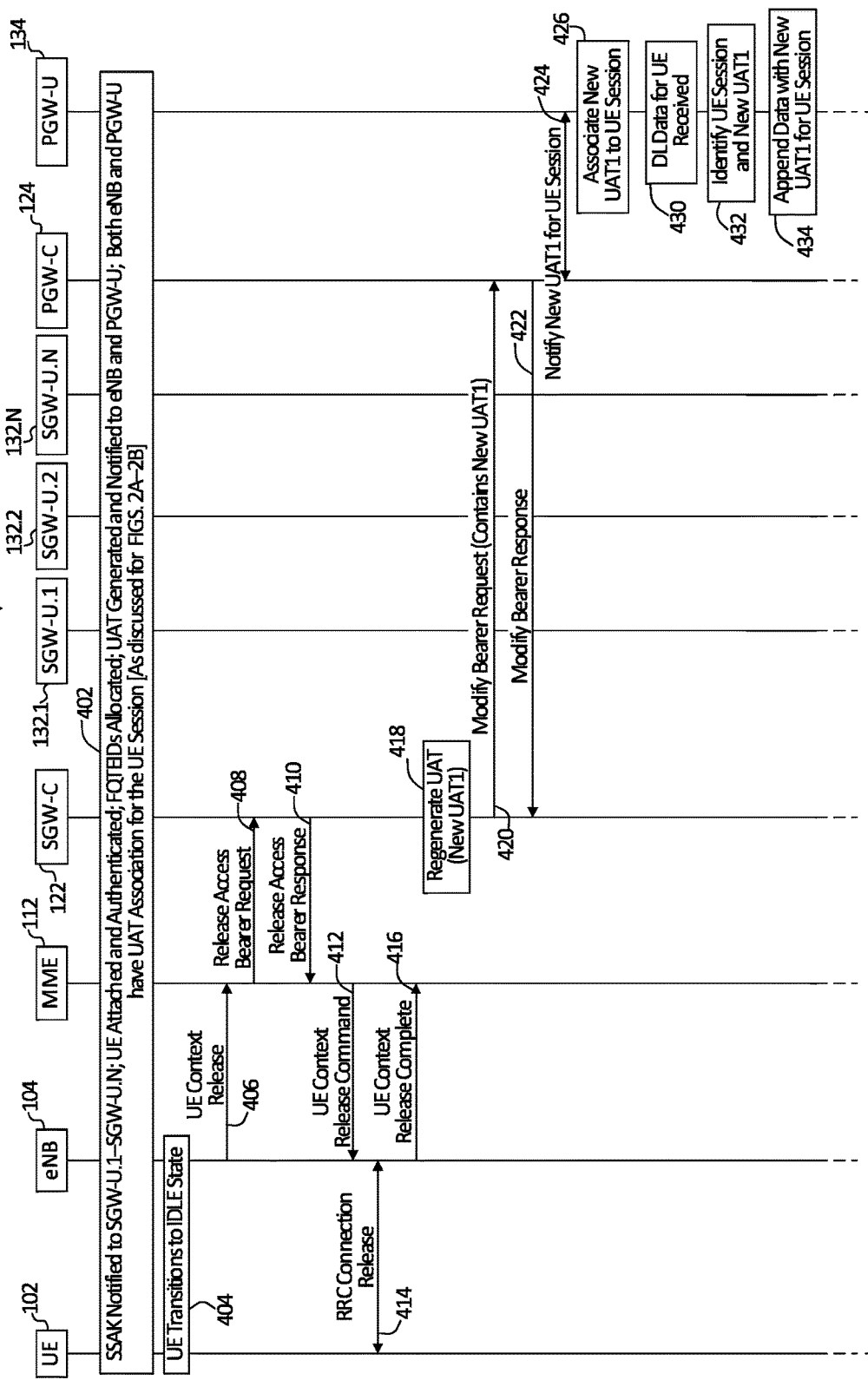

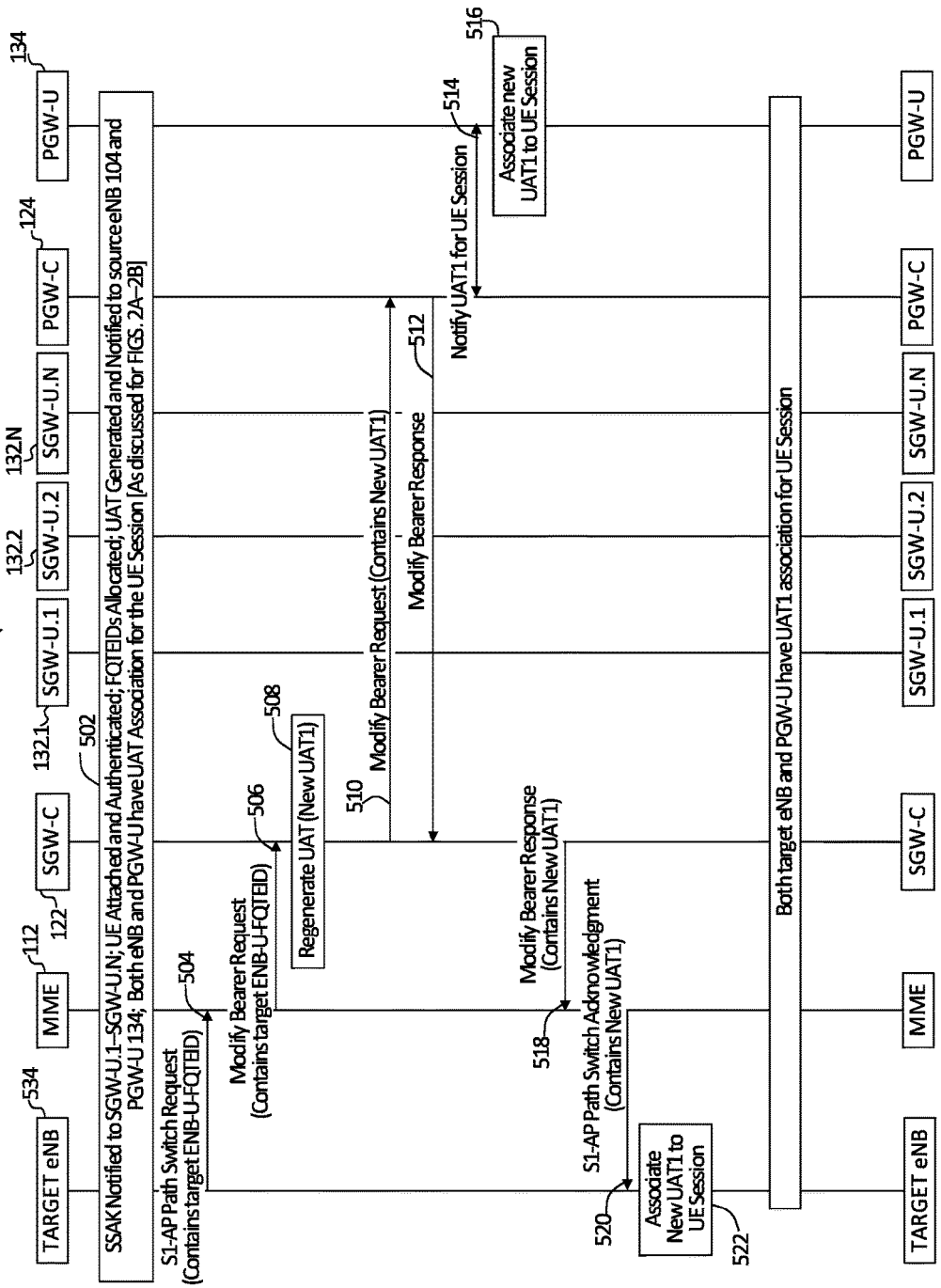

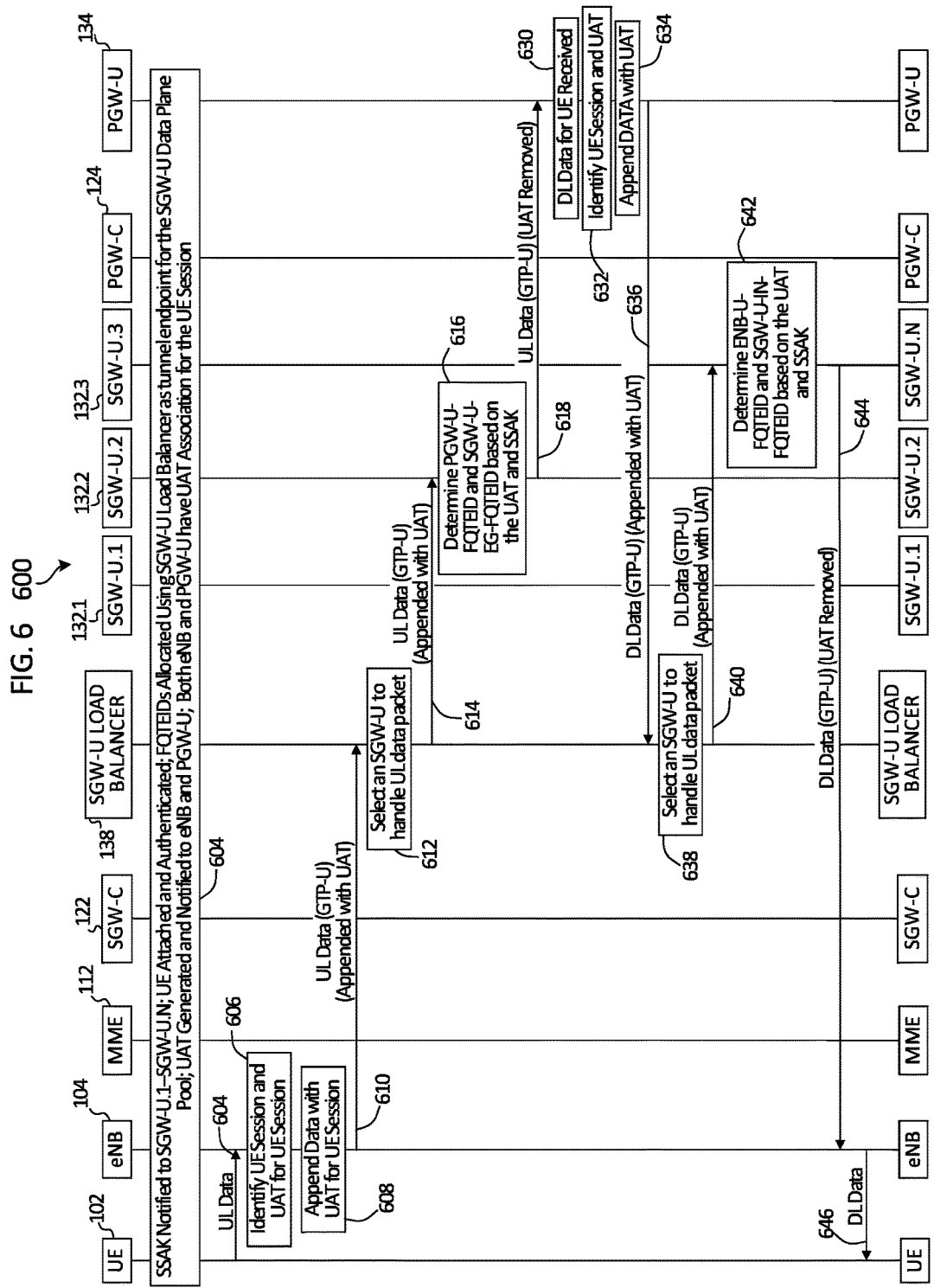

US 10,356,830 B2

SYSTEM AND METHOD TO FACILITATE STATELESS SERVING GATEWAY OPERATIONS IN A NETWORK ENVIRONMENT

TECHNICAL FIELD

This disclosure relates in general to the field of computer networking, and more particularly, to a system and method to facilitate stateless serving gateway (SGW) operations in a network environment.

BACKGROUND

Mobile networking architectures have grown increasingly complex in communication environments. In some cases, mobile network architectures can be implemented using Software Defined Network (SDN) techniques in order to deploy Control and User Plane Separation (CUPS) architectures in which the data path and the control path for a mobile network are split across two planes, a data-plane and a control-plane. As the number of user equipment increases and as CUPS architectures become more prevalent for mobile networking deployments, efficient management of communication resources becomes more critical. Accordingly, there are significant challenges in facilitating CUPS architectures for a network environment.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1 is a simplified block diagram illustrating a communication system that can facilitate stateless serving gateway (SGW) operations according to one embodiment of the present disclosure;

FIGS. 2A-2B are a simplified interaction diagram illustrating example details that can be associated with generating a User Equipment Access Token (UAT) for a user equipment (UE) session in accordance with one potential embodiment of the communication system;

FIG. 3 is a simplified interaction diagram illustrating example details that can be associated with example data-plane operations for the UE session of FIGS. 2A-2B in accordance with one potential embodiment of the communication system;

FIGS. 4A-4C are a simplified interaction diagram illustrating example details that can be associated with example IDLE state and ACTIVE state operations for the UE session of FIGS. 2A-2B in accordance with one potential embodiment of the communication system;

FIG. 5 is a simplified interaction diagram illustrating example details that can be associated with example handover operations for the UE session of FIGS. 2A-2B in accordance with one potential embodiment of the communication system;

FIG. 6 is a simplified interaction diagram illustrating other example details that can be associated with example data-plane operations for a UE session in accordance with one potential embodiment of the communication system.

DETAILED DESCRIPTION OF EMBODIMENTS

Overview

Figure 2B:
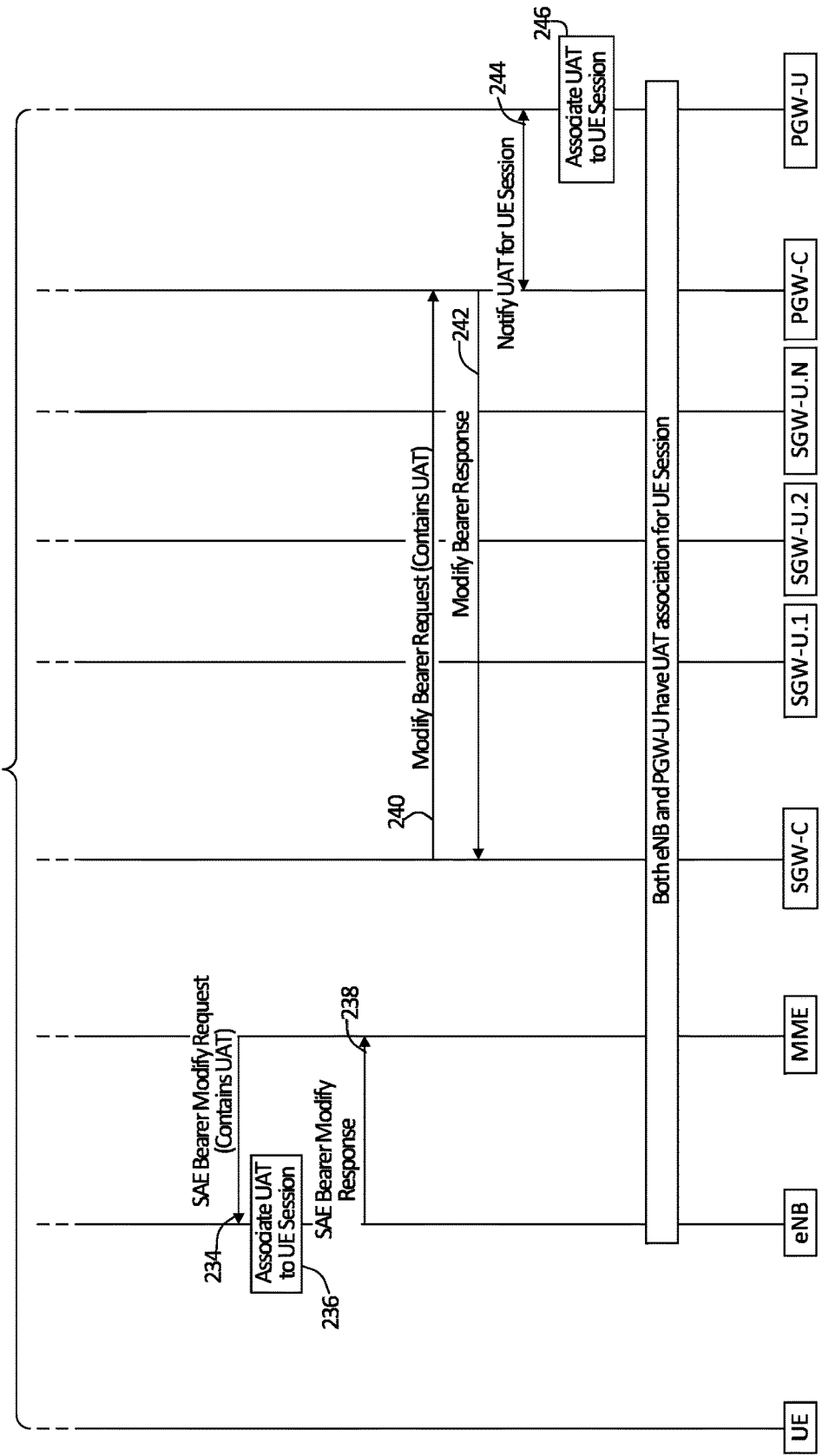

A method is provided in one example embodiment and may include sharing an access key from a control-plane serving gateway (SGW-C) to a plurality of user-plane serving gateways (SGW-Us); allocating a plurality of Fully Qualified Tunnel Endpoint Identifiers (FQTEIDs) associated with a user equipment (UE) session; generating an access token for the UE session based, at least in part, on the access key and the plurality of FQTEIDs; and appending the access token to user-plane packets for the UE session. In some cases, the method can include communicating the access token for the UE session from the SGW-C to a control-plane packet data network gateway (PGW-C) and communicating the access token for the UE session from the SGW-C to a radio node to which the UE is connected. Allocating the plurality of FQTEIDs for the UE session can include: allocating, by the SGW-C, a SGW-U ingress FQTEID and a SGW-U egress FQTEID for the UE session; allocating, by a control-plane packet data network gateway (PGW-C), a user-plane packet data network gateway FQTEID; and allocating, by a radio node to which the UE is connected, a radio node FQTEID.

In some cases, the method can further include receiving an uplink packet for the UE session by a particular SGW-U, wherein the uplink packet is appended with the access token for the UE session; determining an SGW-U egress FQTEID and a user-plane packet data network gateway (PGW-U) FQTEID for the uplink packet based on the access token; and routing the uplink packet toward the PGW-U FQTEID from the particular SGW-U. In still some cases, the method can further include receiving a downlink packet for the UE session by a particular SGW-U, wherein the downlink packet is appended with the access token for the UE session; determining an SGW-U ingress FQTEID and a radio node FQTEID for the downlink packet based on the access token; and routing the downlink packet toward the radio node FQTEID from the particular SGW-U.

In some cases, generating the access token for the UE session can include: generating concatenated pairs of source and destination FQTEIDs using the plurality of FQTEIDs; combining the concatenated pairs using a bitwise operation to generate a bit sequence; and masking or encrypting the bit sequence using the shared key to generate the access token. In still some cases, generating the access token for the UE session can include: concatenating each of the plurality of FQTEIDs in a predefined sequence to generate a bit sequence; and masking or encrypting the bit sequence to generate the access token.

Example Embodiments

For purposes of understanding certain embodiments of systems and architectures disclosed herein, it is important to appreciate the technologies and data that may be associated with network communications for 3rd Generation Partnership Project (3GPP) Long Term Evolution (LTE) Evolved Packet Core (EPC) system architectures, sometimes referred to as 4th Generation (4G)/LTE. The following foundational information may be viewed as a basis from which the present disclosure may be properly explained.

As referred to herein in this Specification, the term 'plane' can refer to a logical separation of traffic that can traverse a network. Three planes can typically be found in communication networks including: a data-plane, a control-plane and a management-plane. The data-plane typically carries or forwards user traffic, while the control-plane typically carries signaling traffic used to provide routing information for user traffic and the management-plane, a subset of the control plane, typically carries administrative traffic. As referred to herein in this Specification, the terms 'user-plane', 'data-plane', 'user data-plane' and 'bearer-plane' can be used interchangeably.

As referred to herein in this Specification, the terms 'virtual machine', 'virtualized network function' and 'virtualized network functionality' can encompass an emulation of a computer system and/or computing platform operating based on the computer architecture and functions of a real or hypothetical computer, with particular embodiments involving specialized hardware, software, or a combination of both. In various embodiments, a virtualized network function (VNF), a virtual machine (VM), a virtualized network function component (VNFC), virtualized functionality and/or any virtualized network controller, element, module, aggregator, combinations thereof or the like as described herein may execute (e.g., be instantiated to perform one or more operation(s)) via a hypervisor-based virtualization or a container-based virtualization of one or more compute node(s) using the compute node(s)' hardware (e.g., processor and memory element), software and/or operating system for a given virtualized network environment. In some cases, a Physical Network Function (PNF) may be referenced herein in this Specification. A PNF is typically associated with a hardware radio head, which can be configured with one or more transmitters and receivers (and other associated hardware and/or software functionality) to facilitate over-the-air (OTA) Radio Frequency (RF) communications.

Compute node(s) having hardware and software resources that can be abstracted into one or more logical layers can also be used to facilitate building and deploying Software Defined Network (SDN) architectures for virtualized network environments. Generally, SDN architectures provide an approach to building and deploying computer networks, networking equipment and software that separates and abstracts the control-plane and data-plane of networking systems. SDN decouples the control-plane that makes decisions about where traffic is sent from the underlying data-plane that forwards traffic to a selected destination. SDN allows network administrators, operators, etc. to manage network services through abstraction of lower level functionality into a virtualized network environment. In various embodiments, a compute node can include, but not be limited to: a data center compute node such as a server, rack of servers, multiple racks of servers, etc. for a data center; a cloud compute node, which can be distributed across one or more data centers.

Communications in a network environment are referred to herein as 'messages', 'messaging' and/or 'signaling', which may be inclusive of packets. Generally, signaling is referred to in reference to control-plane or management-plane packets while messaging can be referred to in reference to control-plane, management-plane or data-plane packets exchanged for communications at the application level.

A packet is a formatted unit of data and can contain both control information (e.g., source and destination address, etc.) and data, which is also known as payload. In some embodiments, control information can be included in headers and trailers for packets. Messages can be sent and received according to any suitable communication protocols. Suitable communication protocols can include a multi-layered scheme such as the Open Systems Interconnection (OSI) Model, or any derivations or variants thereof.

The terms 'data', 'information', 'parameters' and the like as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

In traditional 3GPP EPC architectures, UE's typically connect to a service provider network through over-the-air communications with one or more radio nodes such as evolved Node Bs (eNodeBs or eNBs) and serving Gateways (SGWs) are data plane elements that can route and forward user data packets while also acting as a mobility anchor for inter-3GPP mobility (e.g., handling mobility interfacing to other networks such as 2nd Generation (2G) and/or 3rd Generation (3G) networks) and during inter-eNodeB handoffs or handovers (HO). Further for traditional 3GPP EPC architectures, Packet Data Network (PDN) Gateways (PGWs) may provide user equipment (UE) Internet Protocol (IP) connectivity access network (IP-CAN) session connectivity to external packet data networks (PDNs), such as, for example, the Internet, an IP Multimedia Subsystem (IMS) or the like. A PGW can serve as a policy enforcement point to manage Quality of Service (QoS), online/offline flow-based charging, data generation, deep-packet inspection, packet filtration, intercept, combinations thereof or the like. For 3G architectures, Serving General Packet Radio Service (GPRS) Support Nodes (SGSNs) can provide features similar to SGWs and Gateway GPRS Support Nodes (GGSNs) can provide features similar to PGWs. For traditional 3GPP EPC architectures, the SGW and the eNodeB are the network elements in which frequent mobility events occur due to HO as UEs move throughout a communication system. As a UE moves throughout the system, the eNB and the SGW serving the UE can change, while the PGW serving the UE typically remains the same.

SDN concepts can be applied to a traditional 3GPP EPC architecture to enable separation of the control- and data-planes in order to implement a Control and User Plane Separation (CUPS) architecture in which the control and split paths are split across the two planes thereby creating a control-plane implemented via one or more controller element(s) and a data-plane implemented via one Forwarder Element(s) (FE(s)). For a 3GPP EPC CUPS architecture, the control-plane controller element(s) can include any number of control-plane SGWs (referred to herein as SGW-Cs) and control-plane PGWs (referred to herein as PGW-Cs) that manipulate the network infrastructure to facilitate end-to-end service provider network connectivity. Also for a 3GPP EPC CUPS architecture, the data-plane FE(s) can include any number of user-plane SGWs (referred to herein as SGW-Us) and user-plane PGWs (referred to herein as PGW-Us) that can process and perform operations on subscriber (e.g., UE) traffic for a service provider network as the traffic may pass through a series of FE(s). Together, the control-plane and data-plane elements can manage the forwarding of all subscriber traffic through a service provider network. CUPS architectures are often implemented to decrease operating costs, increase deployment flexibility and speed-up development.

In current CUPS architectures, SGW-U selection and SGW-U programming happens during UE call establishment based on control plane signaling for the call establishment. Generally, the MME selects an SGW-U to handle traffic of a UE session programming can include configuring one or more flow tables that describe packet forwarding to a port (e.g., physical, logical, etc.) or group tables that can include flow entries that describe packet forwarding to a group. The selection and programming is typically performed to enable an SGW-U to route and handle any further data traffic to or from a given UE.

However, there are several drawbacks with the implementation of SGW-Us in current CUPS architectures, including that: a SGW-U is a fully stateful node that needs to maintain session information across various events; routing of uplink and downlink data traffic for a given UE should be always routed to a same SGW-U that is serving as the SGW bearer plane (e.g., data-plane) element for the given UE irrespective of the given UE's location unless the UE's SGW-C is also changed; and current CUPS architectures do not support use cases wherein, if due to a mobility event (e.g., a UE moves), only the bearer plane needs to be changed and/or moved. At the protocol level, there are currently no provisions to only change SGW user-plane GPRS Tunneling Protocol (GTP-U) tunnels in an EPC network, rather the SGW-C and SGW-U should both change at a same time.

Referring to FIG. 1, FIG. 1 is a simplified block diagram illustrating a communication system 100 that can, in various embodiments as described herein, overcome the aforementioned shortcomings of current CUPS architectures by providing a system and method to facilitate stateless user-plane SGW (SGW-U) operations in a network environment. Communication system 100 can include a Radio Access Network (RAN) 110, a user operating user equipment (UE) 102, an eNB 104, a Mobility Management Entity (MME) 112, a control-plane SGW (SGW-C) 122 and a control-plane PGW (PGW-C) 124 of a logical control-plane 120, an 'N' number of user-plane SGWs (SGW-U.1-SGW-U.N) 132.1-132.N and a user-plane PGW (PGW-U) 134 of a logical data-plane 130, and one or more packet data network(s) (PDN(s)) 140. SGW-U.1-SGW-U.N 132.1-132.N can form an SGW-U data-plane (also referred to interchangeably as bearer-plane) pool 136. In some embodiments, an SGW-U load balancer (LB) 138 can be deployed or configured for communication system 100.

UE 102 can interface with eNB 104 via one or more over-the-air (OTA) Radio Frequency (RF) communication channels. The eNB 104 can further interface with MME 112 via an S1-MME interface, as defined by 3GPP standards, and can also interface with each SGW-U.1-SGW-U.N 132.1-132.N of the SGW-U data plane 136 via N corresponding S1-U interfaces. The S1-U interfaces can carry GTP-U packets. Each SGW-U.1-SGW-U.N 132.1-132.N can further interface with PGW-U 134 via N corresponding user-plane S5 (S5-U) interfaces and/or N corresponding user-plane S8 (S8-U) interfaces. In general, the S8 interface is used when a UE is roaming between different network operators and the S5 interface is a network internal interface for a given operator. PGW-U 134 can interface with PDN(s) 140 using a number of SGi interface(s), depending on the number of PDN(s).

MME 112 can further interface with SGW-C 122 via an S-11 interface, which can carry control-plane GTP (GTP-C) packets. SGW-C 122 can further interface with each SGW-U.1-SGW-U.N 132.1-132.N via N control-plane interfaces. SGW-C 122 can further interface with PGW-C 124 via a control-plane S5 (S5-C) interface and/or a control-plane (S8-C) interface. PGW-C can further interface with PGW-U 134 via a control-plane interface.

RAN 110 can provide a communications interface between UE 102 and the control-plane and data-plane elements of communication system 100. In various embodiments, RAN 110 may include 3GPP access networks such as, for example, Global System for Mobile Communications (GSM) Enhanced Data Rates for GSM Evolution (EDGE) Radio Access Network (GERAN), generally referred to as 2nd Generation (2G), Universal Mobile Telecommunications System (UMTS) Terrestrial Radio Access Network (UTRAN), generally referred to as 3G, evolved-UTRAN (E-UTRAN), generally referred to as 4G, Long Term Evolution (LTE) or LTE-Advanced (LTE-A), and/or 5th Generation (5G) or beyond RANs. In various embodiments, RAN 110 may include non-3GPP IP access networks such as digital subscriber line (DSL), Cable, a wireless local area network (WLAN) such as Institute of Electrical and Electronic Engineers (IEEE) 802.11 (e.g., Wi-Fi, HotSpot 2.0) access networks, Worldwide Interoperability for Microwave Access (WiMAX)), and/or or the Internet.

Although RAN 110 is illustrated as including only one eNB 104, any number of eNBs and/or other RF radio nodes can be deployed in communication system 100 to implement any other 3GPP (e.g., 2G, 3G, 5G, etc.) and/or non-3GPP (e.g., Wi-Fi, WiMAX, etc.) access networks such as, for example, Node B/Radio Network Controller (nodeB/RNC) nodes, a Home nodeB (HNB) nodes, Home eNodeB (HeNB) nodes, residential gateways (RG), Wi-Fi Access Point (AP) nodes, combinations thereof or the like. Similarly, although only one UE 102 is illustrated for communication system 100, it should be understood that any number of UEs can be present in the communication system. In various embodiments PDN(s) 140 can include, but not be limited to, any combination of the Internet, managed video, ICN services, IP Multimedia Subsystem (IMS) and/or any other Access Point Name (APN) to which a UE may connect.

Generally, an MME (e.g., MME 112) is a control-plane element that can provide tracking area list management, idle mode UE management, bearer activation and deactivation, SGW (SGW-U and SGW-C) and PGW (PGW-U and PGW-C) selection for UEs, and authentication services. A Radio Access Bearer (RAB) or, more generally, a 'bearer' can refer to a path, channel, tunnel or the like through which communications can be exchanged between two endpoints for a particular service, application, etc. Typically, bearers are referred to in association to communications exchanged between a UE and one or more nodes of the EPC. At a minimum, a default bearer is established for a given UE, as defined in 3GPP standards, upon initial attachment of the UE to a given RAN radio node (e.g., eNB 104). In some embodiments, one or more dedicated bearers can be established for a given UE for one or more specialized services or applications provided to the UE such as, for example, a Voice over LTE (VoLTE) session, a data session, a Voice over IP (VoIP) session, a gaming session, combinations thereof or the like. Although a CUPS-based PGW (e.g., PGW-C and PGW-U) is shown for the embodiment of FIG. 1, it should be understood that operations for communication system 100 can also be performed in a non-CUPS-based PGW (e.g., no PGW-C or PGW-U) is deployed for the communication system.

In general, a bearer for a given UE is associated with the following: 1) an IP address for the UE, which can be allocated from a pool of IP addresses via DHCP, SLAAC, etc.; 2) an IP address for each node associated with a given PDN connection; and 3) a GTP-U tunnel extending between a PGW-U and an SGW-U and a GTP-U tunnel extending between the SGW-U and the eNB to which the UE is connected (if the UE is in a CONNECTED or ACTIVE mode or state as opposed to an IDLE mode or state). A bearer can be identified using an EPS Bearer Identity (EBI). Other tunnels can be created in communication system 100 for various embodiments as described herein.

To facilitate stateless SGW-U operations in communication system 100, SGW-C 122 can, during operation, share a SGW-U Secret/Shared Access Key (SSAK) with each SGW-U.1-SGW-U.N 132.1-132.N in the SGW-U data-plane pool 136. In various embodiments, an SSAK can be a 128-bit key that can either generated by the SGW-C 122 and shared with each SGW-U.1-SGW-U.N 132.1-132.N as part of an initial handshake and capability exchange (e.g., during power-on, initialization, etc.) between the SGW-C 122 and each SGW-U.1-SGW-U.N 132.1-132.N or can be configured for the SGW-C 122 (e.g., by a network operator) and shared with each SGW-U.1-SGW-U.N 132.1-132.N. In at least one embodiment, the SGW-C 122 can generate an SSAK based on a configurable 16 character password. The password can be configured by a network operator and can be changed on a periodic or need-based basis. A key generation function configured for the SGW-C 122 can take the password as an input to generate a 128 bit SSAK.

In at least one embodiment, stateless SGW-U operation may assume that an SGW-U is involved in minimal packet processing and charging (e.g., for VoLTE and IoT cases) where charging is primarily performed by the PGW-U and/or a network beyond the PGW-U. In at least one embodiment, stateless SGW-U operation may also assume that SGW-Us for an SGW-U data-plane pool can be scaled up or down independently of SGW-C capabilities to provide more elasticity for communication system 100.

During call establishment for a given UE (e.g., for UE 102), SGW-C 122 can, upon receiving a Create Session Request message for the UE from MME 112, allocate each of a Fully Qualified Tunnel Endpoint Identifier (referred to herein as FQTEID or F-TEID) identifying source and destination FQTEIDs for GTP-U tunnels associated with the UE 102 session. For embodiments in which no SGW-U load balancer (e.g., SGW-U load balancer 138) is deployed in communication system 100, MME 112 can select a particular SGW-U to handle traffic for a UE session as is typically provided for standards-based SGW-U selection for CUPS architectures. For embodiments in which an SGW-U load balancer (e.g., SGW-U load balancer 138) is deployed in communication system 100, the MME 112 can select the IP address of the SGW-U load balancer 138 for a UE session. In such embodiments, UE data plane traffic can be routed to the SGW-U load balancer, which can select an SGW-U from the pool of SGW-U.1-SGW-U.N 132.1-132.N to handle traffic for the UE session and route the traffic to the selected SGW-U of the pool. In some embodiments, the SGW-U load balancer 138 can select one SGW-U to handle uplink packets for a UE session and can select a different SGW-U to handle downlink packets for the UE session.

For embodiments in which no SGW-U load balancer is deployed in communication system 100, the SGW-C 122 can allocate: 1) an SGW-U ingress GTP-U Tunnel Endpoint Identifier (TEID) and associated IP address that identifies an SGW-U-ingress FQTEID (SGW-U-IN-FQTEID) for a GTP-U tunnel between the eNB to which the UE is attached (e.g., eNB 104) and any SGW-U.1-SGW-U.N 132.1-132.N of the SGW-U data-plane pool 136 as selected by the MME 112 that may be used to exchange data-plane traffic for a session associated with the UE; and 2) an SGW-U egress GTP-U TEID and associated IP address that identifies an SGW-U-egress FQTEID (SGW-U-EG-FQTEID) for a GTP-U tunnel between any SGW-U.1-SGW-U.N 132.1-132.N of the SGW-U data-plane pool 136 as selected by the MME 112 and the PGW-U 134 that may be used to exchange data-plane traffic for the session associated with the UE 102. For embodiments in which an SGW-U load balancer (e.g., SGW-U load balancer 138) is deployed in communication system 100, the SGW-C 122 allocated SGW-U-IN-FQTEID can correspond to an ingress FQTEID of the SGW-U load balancer and the allocated SGW-U-EG-FQTEID can correspond to an egress FQTEID of the SGW-U load balancer.

It should be noted that the terms 'ingress' and 'egress' are described herein relative to the uplink Create Session Request received from a UE upon attaching to an eNB. During operation, ingress, egress, source and destination FQTEIDs can be relative to the direction of a packet traversing the data-plane in relation to whether the packet is associated with uplink data received from a UE or downlink data to be sent to a UE.

SGW-C 122 can send a Create Session Request message to PGW-C 124 for the UE and PGW-C 124 can allocate a PGW-U GTP-U TEID and associated IP address that identifies a PGW-U FQTEID (PGW-U-FQTEID) for a GTP-U tunnel associated with PGW-U 134 for the UE 102 session. The PGW-U 134 can send the PGW-U-FQTEID to SGW-C 122 in a Create Session Response message. For embodiments in which no SGW-U load balancer is deployed for communication system 100, the GTP-U tunnel can extend between the PGW-U 134 and any particular SGW-U.1-SGW-U.N 132.1-132.N of the SGW-U data-plane pool 136 as selected by the MME during UE authentication. For embodiments in which an SGW-U load balancer is deployed for communication system 100, the GTP-U tunnel can extend between the PGW-U 134 and the SGW-U load balancer.

SGW-C 122 can also send a Create Session Response to MME 112, which can trigger an S1-Application Protocol (S1-AP) Initial Setup Context Request message to be sent from MME 112 to the eNB 104. Upon receiving the Context Request message, eNB 104 can allocate a user-plane eNB (eNB-U) GTP-U TEID and associated IP address that identifies an eNB-U FQTEID (ENB-U-FQTEID) for a GTP-U tunnel associated with eNB 104 the UE 102 session. The eNB 104 can send the ENB-U-FQTEID to the MME 112 using an S1-AP Initial Setup Context Response message. The MME can then send a Modify Bearer Request message to SGW-C 122 including the ENB-U-FQTEID. For embodiments in which no SGW-U load balancer is deployed, the GTP-U tunnel can extend between the eNB 104 and any SGW-U.1-SGW-U.N 132.1-132.N of the SGW-U data-plane pool 136 that may exchange data-plane traffic for the session associated with the UE as selected by the MME during UE authentication.

Upon receiving the ENB-U-FQTEID, SGW-C 122 can generate a UE Access Token (UAT) identifying the UE session. The UAT for the UE 102 session can be generated by the SGW-C 122 using the SGW-U-IN-FQTEID, the SGW-U-EG-FQTEID, the PGW-U-FQTEID, the ENB-U-FQTEID and the SSAK. In various embodiments, the SGW-C 122 can generate a UAT by concatenating a predefined sequence of each FQTEID or concatenating a predefined sequence of FQTEID source and destination pairs and/or performing logical (e.g., bitwise) exclusive OR (XOR) on the concatenated sequence(s) to generate a bit sequence. The bit sequence can be masked or encrypted using the SSAK to generate the UAT for the UE session. In at least one embodiment, the UAT can be represented as: UAT=SSAK $\odot$ ENB-U-FQTEID $\odot$ SGW-U-IN-FQTEID $\odot$ SGW-U-EG-FQTEID $\odot$ PGW-U-FQTEID, where $\odot$ represents an XOR operator.

In at least one embodiment, operations for generating the UAT for the UE session can be include generating a bit sequence, represented as 'Y', that is based on source and destination FQTEID pairs in which a first FQTEID pair represents the GTP-U tunnel associated with the eNB 104 for the UE session and a second FQTEID pair represents the GTP-U tunnel associated with the PGW-U 134 for the UE session. Generically, Y can equal (source FQTEID<concat>destination FQTEID) XOR (source FQTEID<concat>destination FQTEID). For embodiments discussed herein, it can be assumed that source and destination FQTEID pairs used to generate Y for a given UE session can be associated with uplink packets for the UE session; however, any SGW-U receiving downlink packets for the UE session can recover appropriate source and destination FQTEIDs for the downlink packets by reversing the concatenated source and destination FQTEID pair recovered from the UAT included in the downlink packets. In various embodiments, SGW-U.1-SGW-U.N 132.1-132.N can be configured to identify downlink packets such that the parsing order for uplink-based source and destination FQTEID pairs used to generate Y can be performed appropriately to identify source and destination FQTEIDs for downlink packets (e.g., the source and destination will be reversed for downlink packets compared to uplink packets for a UE session). Although embodiments discussed herein reference uplink-based source and destination FQTEID pairs used to generate Y, it should be understood that downlink-based source and destination FQTEID pairs could also be used to generate Y.

In at least one example embodiment, Y can be generated for the session associated with UE 102 by performing an XOR on the concatenated FQTEID pairs such that Y=(ENB-U-FQTEID<concat>SGW-U-IN-FQTEID) XOR (SGW-U-EG-FQTEID<concat>PGW-U-FQTEID). In one embodiment, Y can be masked with the SSAK as: (SSAK) XOR (Y) to generate the UAT. In another embodiment, the SSAK can be used to encrypt Y using various encryption operations. In some embodiments, an SSAK can be bit masked with a combination of FQTEIDs using bitwise AND, OR and/or shift (e.g., shift left or shift right) operations in addition to and/or in place of XOR operations. In still some embodiments, the SGW-C 122 can generate a UAT by concatenating all the FQTEIDs in a predefined sequence or in a predefined sequence of FQTEID pairs (e.g., source and destination) and/or XOR-ing the pairs to generate a bit sequence and then masking or encrypting the bit sequence using the SSAK to generate the UAT. In various embodiments, the encrypting a bit sequence using an SSAK can include encryption operations including, but not limited to: Shamir's Secret Sharing Scheme (SSSS), block cipher encryption (e.g., using the Advanced Encryption Standard (AES)), keyed-hash message authentication (H MAC), combinations thereof or the like.

The SGW-C 122 can respond to the Modify Bearer Request received from the MME 112 with a Modify Bearer Response message containing the UAT generated for the UE 102 session. The MME 112 can send a System Architecture Evolution (SAE) Bearer Modify Request message to the eNB containing the UAT and the eNB can associate the UAT to the UE session (e.g., store an association of the UAT with an ID of the UE, the bearer ID for the UE session and/or an ID of the subscriber associated with the UE). The SGW-C 122 can also send a Modify Bearer Request message to the PGW-C 124, which can notify PGW-U 134 of the UAT for the UE session. PGW-U 134 can associate the UAT to the UE session. In this manner, the eNB 104 and the PGW-U 134 can gain awareness of the UAT for the UE's session. In an embodiment, notification of a UAT to a PGW-U can be based on Sx protocol signaling, which may be similar to GTP.

During operation, the eNB 104 and PGW-U 134 can include the UAT as a new Information Element (IE) in each GTP-U packet sent toward the SGW-U data-plane pool 136 (e.g., sent towards a particular SGW-U or sent towards the SGW-U load balancer 138, depending on deployment configuration). An example GTP-U packet 150 is illustrated in FIG. 1. Example GTP-U packet 150 can include a payload 154 and IP source and destination address information (e.g., UE IP address, PDN IP address, etc.) for an IP packet 152 that is encapsulated using GTPv2 to include a UAT IE 158 carrying the UAT for the UE session and GTPv2 source and destination FQTEIDs that can be used to route the GTP-U packet 150 for the tunnel associated with the UE session. Other information and/or fields can be present for the GTP-U packet 150 but have been omitted in order to illustrate features associated with the communication system.

Any SGW-U.1-SGW-U.N 132.1-132.N of the SGW-U data-plane pool 136 can receive a GTP-U packet for a UE session containing the UAT and can recover the appropriate source FQTEID and destination FQTEID for forwarding the packet using the UAT included with the packet and the SSAK received from the SGW-C 122. In one embodiment, if XOR masking and concatenation are used to generate a UAT then an SGW-U receiving a GTP-U packet for a UE session and can unmask or decrypt the packet using the SSAK and then perform XOR or other bitwise operations on the UAT to determine each FQTEID contained in the UAT. Based on the predefined sequence of concatenated FQTEIDs contained in the UAT, the SGW-U can recover the appropriate FQTEIDs needed to forward the packet to a given destination (e.g., the eNB to which the UE is attached for downlink (DL) packets or the PGW-U for uplink (UL) packets).

Consider an example involving the UAT as discussed above in which the UAT for the UE 102 session was generated by masking Y with the SSAK. For this example, assume an uplink packet is received by SGW-U.1 132.1 from eNB 104 for the session associated with UE 102. The uplink packet can be received directly from the eNB 104 or indirectly via the SGW-U load balancer 138, if deployed for communication system 100. The uplink packet received by SGW-U.1 132.1 can include a source FQTEID identifying the ENB-U-FQTEID, a destination FQTEID identifying the SGW-U-IN-FQTEID, and the UAT for the UE 102 session. Using the SSAK, SGW-U.1 132.1 can unmask the UAT to generate Y; recall, Y=(ENB-U-FQTEID<concat>SGW-U-IN-FQTEID) XOR (SGW-U-EG-FQTEID<concat>PGW-U-FQTEID) for the UE 102 session. Using Y and the ENB-U-FQTEID concatenated with the SGW-U-IN-FQTEID, SGW-U.1 132.1 can recover (also referred to herein as 'determine') a source FQTEID for the packet, SGW-U-EG-FQTEID, and a destination FQTEID, PGW-U-FQTEID, for the PGW-U GTP-U tunnel associated with the UE 102 session.

Another XOR operation can be performed by SGW-U.1 132.1 using Y, which can be represented as: (Y) XOR (ENB-U-FQTEID<concat>SGW-U-IN-FQTEID)=(SGW-U-EG-FQTEID<concat>PGW-U-FQTEID) where the (SGW-U-EG-FQTEID<concat>PGW-U-FQTEID) is recovered using the operation. The concatenation of (SGW-U-EG-FQTEID<concat>PGW-U-FQTEID) can be parsed into the destination FQTEID, PGW-U-FQTEID, for the packet and the source FQTEID, SGW-U-EG-FQTEID, for the packet. Using the source and destination FQTEIDs, the SGW-U.1 132.1 can route the packet to the PGW-U 134. The UAT can be removed for the packet routed to the PGW-U 134.

Consider another example in which it is assumed that a downlink packet is received by SGW-U.1 132.1 from PGW-U 134 (e.g., either directly or indirectly) for the session associated with UE 102. The downlink packet received by SGW-U.1 132.1 can include a source FQTEID identifying the PGW-U-FQTEID, a destination FQTEID identifying the SGW-U-EG-FQTEID, and the UAT for the UE 102 session. The SGW-U.2 132.1 can unmask the UAT using the SSAK to generate Y for the UE 102 session; recall, Y=(ENB-U-FQTEID<concat>SGW-U-IN-FQTEID) XOR (SGW-U-EG-FQTEID<concat>PGW-U-FQTEID) for the UE 102 session, where Y was generated in relation to uplink packets for the UE session. Using Y and the PGW-U-FQTEID concatenated with the SGW-U-EG-FQTEID, SGW-U.1 132.1 can determine a source FQTEID, SGW-U-IN-FQTEID, and a destination FQTEID, ENB-U-FQTEID, for the eNB-U GTPU-U tunnel associated with the UE session. The SGW-U.1 132.1 can perform an XOR operation, which can be represented as (Y) XOR (SGW-U-EG-FQTEID<concat>PGW-U-FQTEID)=(ENB-U-FQTEID<concat>SGW-U-IN-FQTEID) where the (ENB-U-FQTEID<concat>SGW-U-IN-FQTEID) is recovered using the operation. SGW-U.2 132.1 can identify the packet received from PGW-U 134 as a downlink packet and can parse the concatenation of (ENB-U-FQTEID<concat>SGW-U-IN-FQTEID) in a reverse order to determine the destination FQTEID, ENB-U-FQTEID, for the packet and the source FQTEID, SGW-U-IN-FQTEID, for the packet. Using the source and destination FQTEIDs, the SGW-U.1 132.1 can route the packet to the eNB 104. The UAT can be removed for the packet routed to the eNB 104.

In another embodiment, if encryption via an SSAK is used to generate a UAT, then an SGW-U receiving a GTP-U packet for a UE session can decrypt the UAT using the SSAK to determine each FQTEID contained in the UAT. Based on the predefined sequence of FQTEIDs or FQTEID pairs for which the UAT was generated, the SGW-U can recover the appropriate FQTEIDs needed to forward the packet to a given destination using similar operations as discussed herein for concatenation and masking operations.

Accordingly, communication system 100 can facilitate stateless SGW-U operations such that any SGW-U.1-SGW-U.N 132.1-132.N of the SGW-U data-plane pool 136 can serve any UEs served by the SGW control-plane. None of the SGW-Us of the SGW-U data-plane pool 136 need to explicitly maintain any UE context and any of the SGW-Us can process any packet containing a UAT associated with a given UE's session. Thus, when mobility events for UEs occur, an SGW-U can be optimally chosen using one or more relocation factor(s) and can handle traffic for a session associated with a given UE without triggering any control plane signaling. In various embodiments, relocation factors for choosing an SGW-U to handle traffic for a UE session, which can be performed by MME 112 via SGW-C 122, can include, but not be limited to: UE geographic location, capabilities/load of a current SGW-U handling traffic for the UE session and/or SGW-U relocation without SGW-C relocation.

Thus, communication system 100 can, in various embodiments, provide advantages over current CUPS deployments including, but not limited to: providing that all SGW-Us in an SGW-U data-plane pool are stateless and can handle any traffic for any UE, which can help in scaling in and/or out user-plane nodes without affecting control-plane capabilities; providing context for UL/DL packets themselves, which can be processed faster by SGW-Us without any look-ups, etc.; providing security and integrity to all packets by incorporating the SSAK into UAT generation at the SGW-C and FQTEID recovery at the SGW-Us; and/or providing for cases where, if due to a mobility event, only the bearer-plane for a UE session needs to be changed or moved, no provisioning will be needed at the protocol level in order to just change the SGW GTP-U endpoints in an EPC network. In some embodiments, principles discussed herein for a pool of SGW-Us can be extended to a pool of multiple PGW-Us in which a similar UAT can be generated by the PGW-C and sent to each PGW-U in the pool. In such embodiments, however, when a PGW-U receives a DL packet for a given UE via a SGi or Gi interface, it will query and maintain minimal state information for the UE's DL packets.

Regarding the internal structure of communication system 100, each of the elements of FIG. 1 may couple to one another through simple interfaces or through any other suitable connection (wired or wireless), which provides a viable pathway for network communications. As referred to herein, a physical (wired or wireless) interconnection or interface can refer to an interconnection of one element or node with one or more other element(s), while a logical interconnection or interface can refer to communications, interactions and/or operations of elements with each other, which can be directly or indirectly interconnected, in a network environment.

In various embodiments, communication system 100 can represent a series of points or nodes of interconnected communication paths (wired or wireless) for receiving and transmitting packets of information that propagate through communication system 100. In various embodiments, communication system 100 can be associated with and/or provided by a single network operator or service provider and/or multiple network operators or service providers. In various embodiments, communication system 100 can include and/or overlap with, in whole or in part, one or more packet data network(s) (e.g., one or more packet data network(s) 140). Communication system 100 may offer communicative interfaces between various elements of communication system 100 and may be associated with any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, or any other appropriate architecture or system that facilitates communications in a network environment.

In various embodiments, communication system 100 may implement user datagram protocol/Internet Protocol (UDP/IP) connections and/or transmission control protocol/IP (TCP/IP) communication language protocol in particular embodiments of the present disclosure. However, communication system 100 can alternatively implement any other suitable communication protocol, interface and/or standard, proprietary and/or non-proprietary, for transmitting and receiving messaging and/or signaling. Other protocols, interfaces and/or communication standards that can be used in communication system 100 can include 3GPP Diameter-based protocols, Remote Authentication Dial-In User Service (RADIUS) protocols, Authentication, Authorization and Accounting (AAA) signaling, a Terminal Access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), etc. In various embodiments, AAA signaling can include signaling exchanges facilitated via Diameter, RADIUS, Extensible Messaging and Presence Protocol (XMPP), Simple Object Access Protocol (SOAP), SOAP over Hypertext Transfer Protocol (HTTP), Representational State Transfer (REST), combinations thereof or the like. In some embodiments, secure communications can be facilitated using TCP/IP Secure Sockets Layer (SSL) communications.

In various embodiments, UE 102 can be associated with any electronic device seeking to initiate a flow in communication system 100 via some network. In at least one embodiment, any UE 102 can be configured to facilitate simultaneous connectivity to multiple access networks that may be deployed for communication system 100. The terms 'UE', 'mobile device', 'mobile radio device', 'end device', 'user', 'subscriber' or variations thereof can be used herein in this Specification interchangeably and are inclusive of devices used to initiate a communication, such as a computer, an electronic device such as an (IoT) device (e.g., an appliance, a thermostat, a sensor, a parking meter, etc.), a personal digital assistant (PDA), a laptop or electronic notebook, a cellular telephone, an IP phone, an electronic device having cellular and/or Wi-Fi connection capabilities, a wearable electronic device or any other device, component, element, or object capable of initiating voice, audio, video, media, or data exchanges within communication system 100. UE 102 may also be inclusive of a suitable interface to a human user such as a microphone, a display, a keyboard, or other terminal equipment.

UE 102 may also be any device that seeks to initiate a communication on behalf of another entity or element such as a program, application, a database, or any other component, device, element, or object capable of initiating an exchange within communication system 100. Within communication system 100, IP addresses (e.g., for UE 102 or any other element, node, etc. in communication system 100) can be assigned using Dynamic Host Configuration Protocol (DHCP), Stateless Address Auto-configuration (SLAAC), during default bearer activation processes, or any suitable variation thereof. IP addresses used within communication system 100 can include IP version 4 (IPv4) and/or IP version 6 (IPv6) IP addresses.

In various embodiments, a subscriber associated with a given UE can be identified using one or more identifiers such as, for example, an International Mobile Subscriber Identity (IMSI) or a Temporary IMSI (T-IMSI). An IMSI for a given subscriber is typically stored on a Subscriber Identity Module (SIM) (e.g., a SIM card) within the subscriber's UE. In some embodiments, a UE can be identified within communication system 100 using an S1-AP Identity (ID).

Referring to FIGS. 2A-2B, FIGS. 2A-2B are a simplified interaction diagram 200 illustrating example details that can be associated with generating a UAT for a UE session in accordance with one potential embodiment of communication system 100. FIGS. 2A-2B include UE 102, eNB 104, MME 112, SGW-C 122, SGW-U.1-SGW-U.N 132.1-132.N, PGW-C 124 and PGW-U 134. It is assumed for the purposes of the embodiment of FIGS. 2A-2B that no SGW-U load balancer is deployed for communication system 100; however, the example details discussed for the embodiment of FIGS. 2A-2B can be extended to deployments in which SGW-U load balancer 138 is deployed for communication system 100.

At 202.1, 202.2 thru 202.N, respectively, SGW-C 122 can share an SSAK with SGW-U.1 132.1, SGW-U.2 132.2 thru SGW-U.N 132.N, respectively. In various embodiments, the SSAK can be generated by or configured for the SGW-C 122. Each SGW-U.1-SGW-U.N 132.1-132.N can store the SSAK received from SGW-C 122.

At 204, it is assumed that UE 102 initiates an attach request message toward eNB 104 seeking to attach (e.g., connect) to eNB 104 in order to establish a connection to a particular PDN 140 for a particular session associated with UE 102. Upon receiving the request, eNB 104 invokes a Non-Access Stratum (NAS) transport procedure and sends an S1-AP initial UE message to MME 112 at 206. Upon receiving the S1-AP initial UE message, MME 112 initiates an Authentication Procedure, as defined in 3GPP specifications, to complete authentication of the UE for the UE 102 session at 208 and select an SGW-U to handle traffic for the UE 102 session.

For purposes of the embodiment of FIGS. 2A-2B, it is assumed that MME 112 selects SGW-U.1 132.1 to handle traffic for the UE session; however, it should be understood that MME 112 could select any SGW-U of the SGW-U data plane pool 136 to handle traffic for the UE session. For an embodiment in which SGW-U load balancer 138 were deployed for communication system 100, MME 112 could select the IP address of the load balancer for the UE session.

Under an assumption of successful authentication of the UE 102, MME 112 sends a GTP-C Create Session Request message to SGW-C 122 at 210 via the S-11 interface to establish a bearer tunnel for the UE session. The Create Session Request can include the IMSI for the subscriber associated with UE 102.

SGW-C 122 allocates at 212 an SGW-U-IN-FQTEID (e.g., SGW-U-IN TEID and associated IP address) and an SGW-U-EG-FQTEID (e.g., SGW-U-EG TEID and associated IP address) for GTP-U bearer tunnels associated with the UE session for SGW-U data plane pool 136 (e.g., the selected SGW-U.1 132.1). At 214, SGW-C 122 sends a GTP-C Create Session Request message to PGW-C 124 via the S5-C or the S8-C interface. At 216, PGW-C 124 allocates a PGW-U-FQTEID (e.g., PGW-U TEID and associated IP address) for a GTP-U bearer tunnel that can be used between the PGW-U 134 and the SGW-U data-plane pool 136 (e.g., for the selected SGW-U.1 132.1) to exchange data-plane traffic for the session associated with UE 102. At 218, PGW-C responds to SGW-C 122 with a GTP-C Create Session Response message that contains the PGW-U-FQTEID.

At 220, SGW-C 122 responds to MME 112 with a GTP-C Create Session Response Message, which triggers the MME 112 to send eNB 104 an S1-AP Setup Context Request message at 222. At 224, eNB 104 allocates an ENB-U-FQTEID (e.g., ENB-U TEID and associated IP address for a GTP-U bearer tunnel that can be used between the eNB 104 and the SGW-U data-plane pool 136 (e.g., for the selected SGW-U.1 132.1) to exchange data-plane traffic for the session associated with UE 102. The eNB 104 responds to MME 112 with an S1-AP Initial Setup Context Response message at 226 that contains the ENB-U-FQTEID. MME 112 sends a GTP-C Modify Bearer Request message to SGW-C 122 at 228 that contains the ENB-U-FQTEID.

When the SGW-C 122 has a set of FQTEIDs for the GTP-U tunnels associated with the UE session including the SGW-U-IN-FQTEID, the SGW-U-EG-FQTEID, the PGW- U-FQTEID and the ENB-U-FQTEID, the SGW-C 122 generates a UAT associated with the UE 102 session at 230. SGW-C 122 can generate the UAT using various techniques as discussed for various embodiments described herein (e.g., concatenation operations, XOR operations, masking operations, encryption operations, etc.).

Upon generation of the UAT associated with the UE 102 session, SGW-C 122 can perform various operations to notify the eNB 104 and the PGW-U 134 of the UAT associated with the UE 102 session. At 232, SGW-C 122 responds to MME 112 with a Modify Bearer Response message that contains the UAT generated at 230. At 234, MME 112 sends an SAE Bearer Modify Request message to eNB 104 that contains the UAT for the UE 102 session and, at 236, eNB 104 associates the UAT to the UE 102 session. At 238, eNB 104 responds with an SAE Bearer Modify Response message being sent to MME 112, which can include a cause indicator indicating whether the Bearer Modify request was accepted or rejected.

At 240, SGW-C 122 sends a Modify Bearer Request message to PGW-C 124 that includes the UAT for the UE 102 session. At 242, PGW-C 124 responds to the SGW-C 122 with a Modify Bearer Response message and notifies PGW-U 134 of the UAT for the UE session at 244. At 246, PGW-U 134 associates the UAT to the UE session. In some embodiments, the notification at 244 can involve a notification response being sent from PGW-U 134 to PGW-C 124 indicating successful association of the UAT for the UE session. It should be noted that the order of operations 234, 240, 242, 244 and 246 is provided for illustrative purposes only. In various embodiments, these operations can be performed in any order. For example, in some embodiments, the PGW-C/PGW-U can be notified of the UAT before the eNB. Accordingly, as illustrated in the embodiment of FIGS. 2A-2B, both eNB 104 and PGW-U 134 can have a UAT association for the UE 102 session following the notifications from SGW-C 122.

FIGS. 3, 4A-4C and 5 discussed in further detail below, are described with reference to the embodiment of FIGS. 2A-2B and assume: that the SSAK has been notified to each SGW-U.1-SGW-U.N of the SGW-U data-plane pool 136; that UE 102 is attached and authenticated within the system for a particular UE session; that FQTEIDs have been allocated for the tunnels associated with the UE 102 session; that the UAT has been generated and notified to the eNB 104 and the PGW-U 134; and that both the eNB 104 and the PGW-U 134 have an association of the UAT to the UE 102 session as discussed for the embodiment of FIGS. 2A-2B. It is assumed for the purposes of the embodiments of FIGS. 3, 4A-4C and 5 that no SGW-U load balancer is deployed for communication system 100; however, the example details discussed for the embodiments of FIGS. 3, 4A-4C and 5 can be extended to deployments in which SGW-U load balancer 138 is deployed for communication system 100.

Referring to FIG. 3, FIG. 3 is a simplified interaction diagram 300 illustrating example details that can be associated with example data-plane operations for the UE 102 session of FIGS. 2A-2B in accordance with one potential embodiment of communication system 100. FIG. 3 includes UE 102, eNB 104, MME 112, SGW-C 122, SGW-U.1-SGW-U.N 132.1-132.N, PGW-C 124 and PGW-U 134. At 302, as noted above, the example details for the embodiment of FIG. 3 assume that the SSAK has been notified to each SGW-U.1-SGW-U.N of the SGW-U data-plane pool 136; that UE 102 is attached and authenticated within the system for a particular UE session; that FQTEIDs have been allocated for the tunnels associated with the UE 102 session; that the UAT has been generated and notified to the eNB 104 and the PGW-U 134; and that both the eNB 104 and the PGW-U 134 have an association of the UAT to the UE 102 session as discussed for the embodiment of FIGS. 2A-2B.

At 304, it is assumed for the embodiment of FIG. 3 that UE 102 sends an uplink (UL) data packet to eNB 104. At 306, eNB 104 identifies the session associated with the UE 102 and the UAT associated with the UE 102 session (e.g., performing a look-up using the IMSI for the subscriber associated with UE 102, bearer ID, etc.). At 308, eNB 104 appends, tags or otherwise includes the UL data with the UAT for the UE 102 session using a UAT IE and encapsulates the UAT IE, the UL data and any other information that may be applicable (e.g., IP address information, etc.) in a GTPv2 GTP-U packet. The packet can include GTP-U source and destination information including the ENB-U-FQTEID (source) and the SGW-U-IN-FQTEID (destination) for the bearer tunnel associated with the UE 102 session.

At 310, eNB 104 can forward the GTP-U UL data packet to the SGW-U data-plane pool 136 and for purposes of the embodiment of FIG. 3 it is assumed that eNB 104 forwards the GTP-U UL data packet appended with the UAT to SGW-U.1 132.1, as selected by the MME 112. At 312, SGW-U.1 132.1 decapsulates the UL data and determines the PGW-U-FQTEID and the SGW-U-EG-FQTEID based on the UAT contained in the UAT IE and the SSAK using operations as discussed for various embodiments described herein. At 314, SGW-U.1 132.1 replaces the GTP-U source and destination information with the SGW-U-EG-FQTEID (source) and the PGW-U-FQTEID (destination), re-encapsulates the UL data and any other information that may be applicable in a GTP-U packet and forwards the GTP-U UL data packet to PGW-U 134. The UAT IE is not included with the GTP-U UL data packet sent to the PGW-U 134. Upon receiving the GTP-U UL data packet, PGW-U 134 can process and forward (not shown) the UL data to a given PDN associated with the UE 102 session as prescribed by 3GPP standards. Thus, as shown at 304-314, communication system 100 can facilitate UL data-plane communications for a UE session in accordance with at least one embodiment.

At 320 it is assumed for the embodiment of FIG. 3 that a downlink (DL) data packet for the UE 102 session is received by PGW-U 134. At 322, PGW-U 134 identifies the session associated with the UE and the UAT associated with the UE 102 session (e.g., performing a look-up using the IMSI for the subscriber associated with UE 102, bearer ID, etc.). At 324, PGW-U 134 appends the DL data with the UAT for the UE 102 session using a UAT IE and encapsulates the UAT IE, the DL data and any other information that may be applicable (e.g., IP address information, etc.) in a GTPv2 GTP-U packet. The packet can include GTP-U source and destination information including the PGW-U-FQTEID (source) and the SGW-U-EG-FQTEID (destination) for the bearer tunnel associated with the UE 102 session. At 326, PGW-U 134 can forward the GTP-U DL data packet to the SGW-U data-plane pool 136 and for purposes of the embodiment of FIG. 3 it is assumed that PGW-U 134 forwards the GTP-U DL data packet appended with the UAT to SGW-U.1 132.1, as selected by the MME 112.

At 328, SGW-U.1 132.1 decapsulates the GTP-U DL data and determines the ENB-U-FQTEID and the SGW-U-IN-FQTEID based on the UAT contained in the UAT IE and the SSAK using operations as discussed for various embodiments described herein. At 330, SGW-U.1 132.1 replaces the GTP-U source and destination information with the SGW- U-IN-FQTEID (source) and the ENB-U-FQTEID (destination), re-encapsulates the DL data and any other information that may be applicable in a GTP-U packet and forwards the GTP-U DL data packet to eNB 104. The UAT IE is not included with the GTP-U DL data packet sent to the eNB 104. Upon receiving the GTP-U DL data packet, eNB 104 can process and forward the DL data to UE 102 at 332 as prescribed by 3GPP standards. Thus, as shown at 320-332, communication system 100 can facilitate DL data-plane communications for a UE session in accordance with at least one embodiment.

Figure 4B:
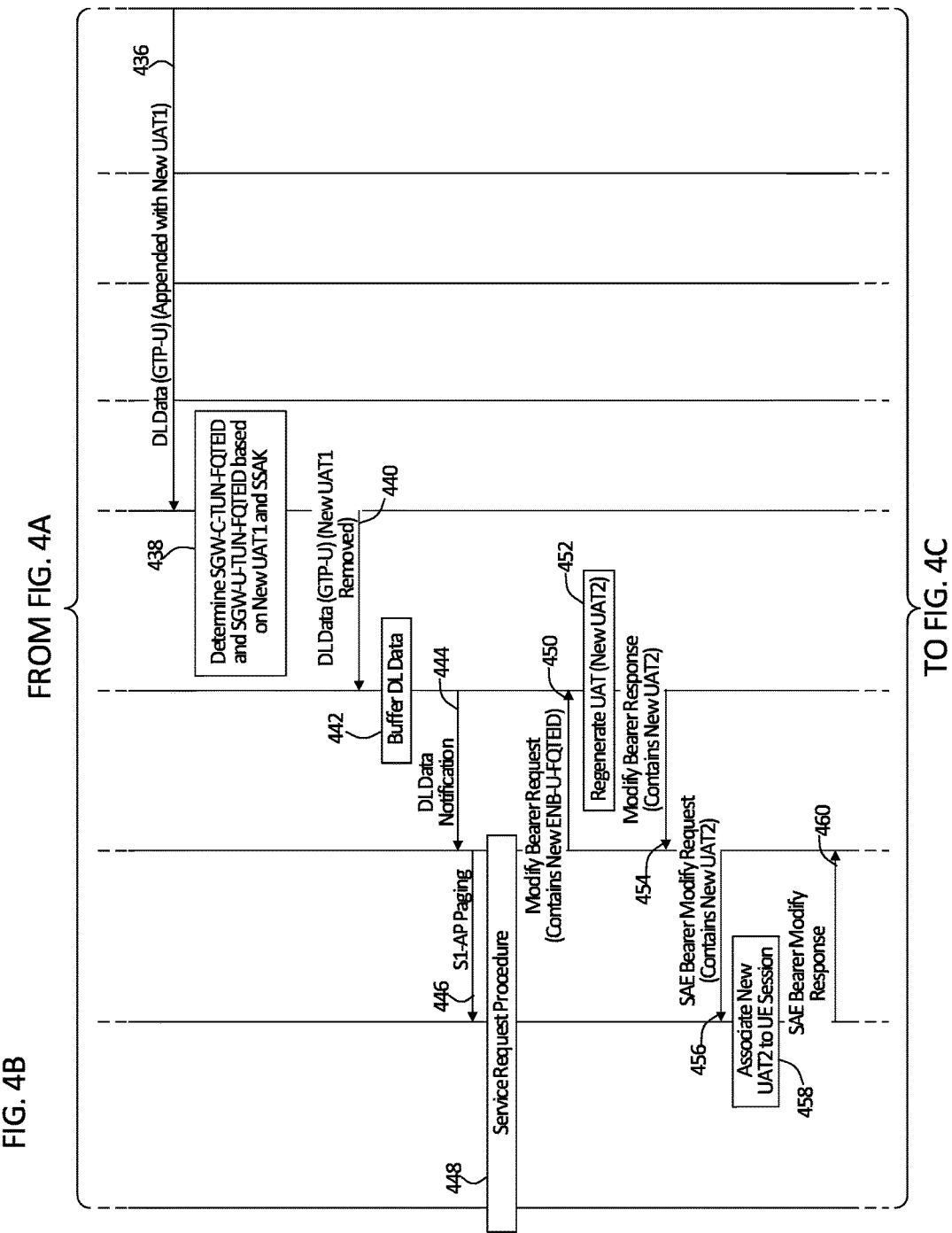
Figure 4C:
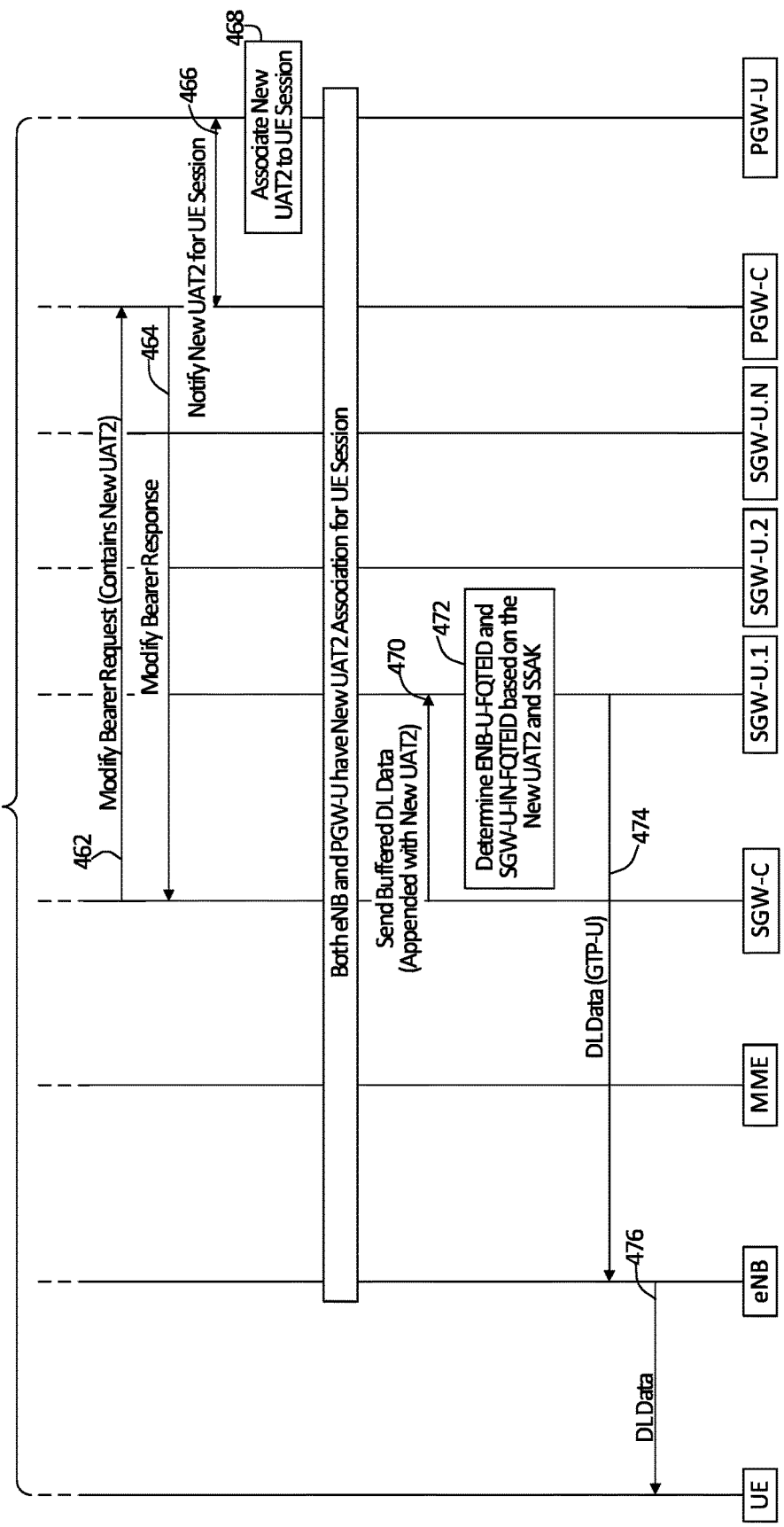

Referring to FIGS. 4A-4C, FIGS. 4A-4C are a simplified interaction diagram 400 illustrating example details that can be associated with example IDLE state and ACTIVE state operations for the UE 102 session of FIGS. 2A-2B in accordance with one potential embodiment of communication system 100. FIGS. 4A-4C include UE 102, eNB 104, MME 112, SGW-C 122, SGW-U.1-SGW-U.N 132.1-132.N, PGW-C 124 and PGW-U 134. At 402, as noted above, the example details for the embodiment of FIGS. 4A-4C assume that the SSAK has been notified to each SGW-U.1-SGW-U.N of the SGW-U data-plane pool 136; that UE 102 is attached and authenticated within the system for a particular UE session; that FQTEIDs have been allocated for the tunnels associated with the UE 102 session; that the UAT has been generated and notified to the eNB 104 and the PGW-U 134; and that both the eNB 104 and the PGW-U 134 have an association of the UAT to the UE 102 session as discussed for the embodiment of FIGS. 2A-2B.

At 404, it is assumed that UE 102 transitions to an IDLE state due to, for example, inactivity, Radio Link Control (RLC) failure or the like. The transition to the IDLE state triggers a UE Context Release message being sent from eNB 104 to MME 112 at 406. At 408, MME 112 sends a Release Access Bearer Request message to SGW-C 122 and the SGW-C responds with a Release Access Bearer Response message at 410. At 412, MME 112 sends a UE Context Release Command to eNB 104 and at 414, a Radio Resource Control (RRC) Connection Release procedure is carried out between the UE 102 and the eNB 104. Following the connection release, eNB 104 sends MME 112 a UE Context Release Complete message at 416 indicating that RRC connection release is complete.

At 418, SGW-C 122 regenerates the UAT associated with the UE 102 session to generate a new UAT, referred to herein for the embodiment of FIGS. 4A-4C as 'New UAT1'. The New UAT1 can be generated using operations as discussed for various embodiments described herein using a combination of the SSAK, the SGW-U-EG-FQTEID, the PGW-U-FQTEID and two additional FQTEIDs that can identify a tunnel extending between SGW-C 122 and the SGW-U data plane pool 136 (e.g., the SGW-U.1 132.1, as selected by the MME 112) for exchanging traffic related to the UE 102 session. The tunnel can be identified using an SGW-C TEID and associated IP address that identifies an SGW-C tunnel FQTEID (SGW-C-TUN-FQTEID) and an SGW-U TEID and associated IP address that identifies an SGW-U tunnel FQTEID (SGW-U-TUN-FQTEID). Using the SSAK, the SGW-U-EG-FQTEID, the PGW-U-FQTEID, the SGW-C-TUN-FQTEID and the SGW-U-TUN-FQTEID, SGW-C 122 can generate the New UAT1 using operations as discussed for various embodiments described herein.

At 420, SGW-C 122 sends a Modify Bearer Request message to PGW-C 124 that includes the New UAT1 for the UE 102 session. At 422, PGW-C 124 responds to the SGW-C 122 with a Modify Bearer Response message and notifies PGW-U 134 of the New UAT1 for the UE session at 424. At 426, PGW-U 134 associates the New UAT1 to the UE session. It should be noted that the order of operations 422, 424 and 426 is provided for illustrative purposes only. In various embodiments, these operations can be performed in any order.

At 430 it is assumed for the embodiment of FIGS. 4A-4C that a downlink (DL) data packet for the UE 102 session is received by PGW-U 134. At 432, PGW-U 134 identifies the session associated with the UE 102 and the New UAT1 associated with the UE 102 session (e.g., performing a look-up using the IMSI for the subscriber associated with UE 102, bearer ID, etc.). At 434, PGW-U 134 appends the DL data with the new UAT1 for the UE 102 session using a UAT IE and encapsulates the UAT IE, the DL data and any other information that may be applicable (e.g., IP address information, etc.) in a GTPv2 GTP-U packet. The packet can include GTP-U source and destination information including the PGW-U-FQTEID (source) and the SGW-U-EG-FQTEID (destination) for the bearer tunnel associated with the UE 102 session. At 436, PGW-U 134 can forward the GTP-U DL data packet to the SGW-U data-plane pool 136 and for purposes of the embodiment of FIGS. 4A-4C it is assumed that PGW-U 134 forwards the GTP-U DL data packet appended with the New UAT1 to SGW-U.1 132.1, as selected by the MME 112.

At 438, SGW-U.1 132.1 decapsulates the GTP-U DL data and determines the SGW-C-TUN-FQTEID and the SGW-U-TUN-FQTEID based on the New UAT1 contained in the UAT IE and the SSAK using operations as discussed for various embodiments described herein. At 440, SGW-U.1 132.1 replaces the GTP-U source and destination information with the SGW-U-TUN-FQTEID (source) and the SGW-C-TUN-FQTEID (destination) and re-encapsulates the DL data and any other information that may be applicable in a GTP-U packet and forwards the GTP-U DL data packet to SGW-C 122. The UAT IE is not included with the GTP-U DL data packet sent to the SGW-C 122.

At 442, SGW-C 122 begins to buffer the DL data and at 444 sends a Downlink Data Notification (DDN) to MME 112 to initiate paging for UE 102 in order to transition the UE back to an ACTIVE state. At 446, MME 112 initiates an S1-AP Paging message toward eNB 104, which initiates a service request procedure at 448 between UE 102, eNB 104 and MME 112 as defined according to 3GPP standards during which eNB 104 allocates a new ENB-U-FQTEID for the UE 102 session. When the UE 102 has transitioned back to an ACTIVE state, MME 112 sends a Modify Bearer Request message to SGW-C 122 at 450 that includes the new ENB-U-FQTEID.

At 452, SGW-C 122 regenerates the UAT associated with the UE 102 session to generate another new UAT, referred to herein for the embodiment of FIGS. 4A-4C as 'New UAT2'. The New UAT2 can be generated using operations as discussed for various embodiments described herein using a combination of the SSAK, the new ENB-U-FQTEID, the SGW-U-IN-FQTEID, the SGW-U-EG-FQTEID and the PGW-U-FQTEID. At 454, SGW-C 122 responds to MME 112 with a Modify Bearer Response message that contains the New UAT2 generated at 452. At 456, MME 112 sends an SAE Bearer Modify Request message to eNB 104 that contains the New UAT2 for the UE 102 session and, at 458, eNB 104 associates the New UAT2 to the UE 102 session. At 460, eNB 104 responds with an SAE Bearer Modify Response message being sent to MME 112.

At 462, SGW-C 122 sends a Modify Bearer Request message to PGW-C 124 that includes the new UAT2 for the UE 102 session. At 464, PGW-C 124 responds to the SGW-C 122 with a Modify Bearer Response message and notifies PGW-U 134 of the New UAT2 for the UE 102 session at 466. At 468, PGW-U 134 associates the new UAT2 to the UE 102 session. It should be noted that the order of operations 464, 466 and 468 is provided for illustrative purposes only. In various embodiments, these operations can be performed in any order. Thus, both eNB 104 and PGW-U 134 can store a new association for New UAT2 for the UE 102 session following the notifications from SGW-C 122.

At 470, SGW-C sends the buffered DL data to SGW-U.1 132.1 via one or more GTP-U DL data packets. Each GTP-U DL data packet can be appended with a UAT IE containing the New UAT2. At 472, SGW-U.1 132.1 decapsulates the GTP-U DL data determines the ENB-U-FQTEID and the SGW-U-IN-FQTEID based on the New UAT2 contained in the UAT IE and the SSAK using operations as discussed for various embodiments described herein. At 474, SGW-U.1 132.1 replaces the GTP-U source and destination information with the SGW-U-IN-FQTEID (source) and the ENB-U-FQTEID (destination) and re-encapsulates the DL data and any other information that may be applicable in a GTP-U packet and forwards the GTP-U DL data packet to eNB 104. The UAT IE is not included with the GTP-U DL data packet sent to the eNB 104. Upon receiving the GTP-U DL data packet, eNB 104 can process and forward the DL data to UE 102 at 476 as prescribed by 3GPP standards. Thus, as shown in the embodiment of FIGS. 4A-4C, communication system 100 can facilitate DL data-plane communications for a UE session in accordance with at least one embodiment.

Referring to FIG. 5, FIG. 5 is a simplified interaction diagram illustrating example details that can be associated with example handover operations for the UE session of FIGS. 2A-2B in accordance with one potential embodiment of communication system 100. FIG. 5 include UE 102, a target eNB 534, MME 112, SGW-C 122, SGW-U.1-SGW-U.N 132.1-132.N, PGW-C 124 and PGW-U 134. For the purposes of the embodiment of FIG. 5, eNB 104 will be referred to as 'source' eNB 104 and is not shown in FIG. 5. Further for the embodiment of FIG. 5, it is assumed that a handoff or handover for UE 102 has occurred such that UE 102 is now connected to the target eNB 534.

At 502, as noted above, the example details for the embodiment of FIG. 5 assume that the SSAK has been notified to each SGW-U.1-SGW-U.N of the SGW-U dataplane pool 136; that UE 102 is attached and authenticated within the system for a particular UE session; that FQTEIDs have been allocated for the tunnels associated with the UE 102 session; that the UAT has been generated and notified to the source eNB 104 and the PGW-U 134; and that both eNB 104 and the PGW-U 134 have an association of the UAT to the UE 102 session as discussed for the embodiment of FIGS. 2A-2B.

In cases involving inter-eNB handoffs or handovers, the FQTEID for the new/target eNB will be notified to MME in S1AP Path Switch Request message. Thus, as shown at 504, the target eNB 534 sends an S1-AP Path Switch Request message to MME 112 including the target ENB-U-FQTEID. At 506, MME 112 sends a Modify Bearer Request message to SGW-C 122 that includes the target ENB-U-FQTEID. At 508, SGW-C 122 regenerates the UAT associated with the UE 102 session to generate a new UAT, referred to herein for the embodiment of FIG. 5 as 'New UAT1'. The New UAT1 can be generated using operations as discussed for various embodiments described herein using a combination of the SSAK, the target ENB-U-FQTEID, the SGW-U-IN-FQTEID, the SGW-U-EG-FQTEID and the PGW-U-FQTEID.

At 510, SGW-C 122 sends a Modify Bearer Request message to PGW-C 124 that includes the new UAT1 for the UE 102 session. At 512, PGW-C 124 responds to the SGW-C 122 with a Modify Bearer Response message and notifies PGW-U 134 of the New UAT1 for the UE 102 session at 514. At 516, PGW-U 134 associates the New UAT1 to the UE 102 session. At 518, SGW-C 122 responds to MME 112 with a Modify Bearer Response message that contains the new UAT1 generated at 508. At 520, MME 112 sends an S1-AP Path Switch Acknowledgment message to the target eNB 534 that contains the new UAT1 for the UE 102 session and, at 522, the target eNB 534 associates the New UAT1 to the UE 102 session. It should be noted that the order of operations regarding 510 and 518 is provided for illustrative purposes only. In various embodiments, these operations can be performed in any order. For example, in some embodiments, the target eNB can be notified of the New UAT1 before the PGW-C/PGW-U. Accordingly, as illustrated in the embodiment of FIG. 5, both the target eNB 534 and PGW-U 134 can have a New UAT1 association for the UE 102 session following the notifications from SGW-C 122 for the handover of UE 102 to the target eNB 534.

Referring to FIG. 6, FIG. 6 is a simplified interaction diagram 600 illustrating other example details that can be associated with example data-plane operations for a UE 102 in accordance with one potential embodiment of communication system 100. In particular, the embodiment of FIG. 6 illustrates that any SGW-U of the SGW-U data plane pool 136 can receive and forward UL and/or DL data for a given UE session in accordance with at various embodiments of the communication system.

FIG. 6 includes UE 102, eNB 104, MME 112, SGW-C 122, SGW-U load balancer 138, SGW-U.1 132.1, SGW-U.2 132.2 and another SGW-U.3 132.3, PGW-C 124 and PGW-U 134. At 602, it is assumed that an SSAK has been notified to each SGW-U.1-SGW-U.3 of the SGW-U dataplane pool 136; that UE 102 is attached and authenticated within the system for a particular UE session; that MME 112 has selected the SGW-U load balancer 138 IP address for the UE 102 session; that FQTEIDs have been allocated for the tunnels associated with the UE 102 session using the SGW-U load balancer 138 as the tunnel endpoint for data traffic sent to the SGW-U data plane pool 136; that a UAT has been generated for the UE 102 session and notified to the eNB 104 and the PGW-U 134; and that both the eNB 104 and the PGW-U 134 have an association of the UAT to the UE 102 session. Operations at 602 can be performed as discussed for various embodiments described herein.

At 604, it is assumed for the embodiment of FIG. 6 that UE 102 sends an uplink (UL) data packet to eNB 104. At 606, eNB 104 identifies the session associated with the UE 102 and the UAT associated with the UE 102 session (e.g., performing a look-up using the IMSI for the subscriber associated with UE 102, bearer ID, etc.). At 608, eNB 104 appends, tags or otherwise includes the UL data with the UAT for the UE 102 session using a UAT IE and encapsulates the UAT IE, the UL data and any other information that may be applicable (e.g., IP address information, etc.) in a GTPv2 GTP-U packet. The packet can include GTP-U source and destination information including the ENB-U-FQTEID (source) and the SGW-U-IN-FQTEID (destination) for the bearer tunnel associated with the UE 102 session, where the SGW-U-IN-FQTEID corresponds to an ingress FQTEID for the SGW-U load balancer 138.

At 610, eNB 104 forwards the GTP-U UL data packet to the SGW-U load balancer 138. The SGW-U load balancer is stateless and UDP port based. At 612, the SGW-U load balancer 138 selects an SGW-U to handle the packet for the UE 102 session. In at least one embodiment, SGW-U load balancer 138 can use health check logic to maintain a health status of each of the active elements (e.g., SGW-U.1-SGW-U.N 132.1-132.N) of the SGW-U data plane pool 136. In various embodiments, health of active elements for the SGW-U data plane pool 136 can be associated with one or more of: congestion experienced by each element; current load of each element; error conditions, failures and/or cause codes associated with one or more element(s) communicated to or determined by SGW-U load balancer 138; combinations thereof or the like. In some embodiments, load and/or congestion can be compared against one or more threshold values to character the load and/or congestion experienced by each element of the SGW-U data plane pool 136.

In at least one embodiment, SGW-U load balancer 138 can use round-robin based logic to distribute traffic to active and healthy elements (e.g., elements having a load and/or congestion below a certain threshold, elements not having errors, failures, etc.) of the SGW-U data planet pool 136. For purposes of the embodiment of FIG. 6, it is assumed that SGW-U load balancer 138 selects SGW-U.2 132.2 to receive the UL data packet for the UE 102 session.

At 614, the SGW-U load balancer 138 forwards the GTP-U UL data packet to SGW-U.2 132.2. The packet is still appended with the UAT. At 616, SGW-U.2 132.2 decapsulates the UL data and uses the UAT contained in the UAT IE to determine the PGW-U-FQTEID and the SGW-U-EG-FQTEID based on the UAT and the SSAK using operations as discussed for various embodiments described herein where the SGW-U-EG-FQTEID corresponds to an egress FQTEID for the SGW-U load balancer 138.

At 618, SGW-U.2 132.2 replaces the GTP-U source and destination information with the SGW-U-EG-FQTEID (source) and the PGW-U-FQTEID (destination) and re-encapsulates the UL data and any other information that may be applicable in a GTP-U packet and forwards the GTP-U UL data packet to PGW-U 134. The UAT IE is not included with the GTP-U UL data packet sent to the PGW-U 134. Upon receiving the GTP-U UL data packet, PGW-U 134 can process and forward (not shown) the UL data to a given PDN associated with the UE 102 session, as prescribed by 3GPP standards.

At 630 it is assumed for the embodiment of FIG. 6 that a downlink (DL) data packet for the UE 102 session is received by PGW-U 134. At 632, PGW-U 134 identifies the UE 102 session the UAT associated with the UE 102 session (e.g., performing a look-up using the IMSI for the subscriber associated with UE 102, bearer ID, etc.). At 634, PGW-U 134 appends the DL data with the UAT for the UE 102 session using a UAT IE and encapsulates the UAT IE, the DL data and any other information that may be applicable (e.g., IP address information, etc.) in a GTPv2 GTP-U packet. The packet can include GTP-U source and destination information including the PGW-U-FQTEID (source) and the SGW-U-EG-FQTEID (destination) for the bearer tunnel associated with the UE 102 session where the SGW-U-EG-FQTEID corresponds to the SGW-U load balancer 138.

At 636, PGW-U 134 forwards the GTP-U DL data packet to the SGW-U load balancer 138. At 638, the SGW-U load balancer 138 selects an SGW-U to handle the packet for the UE 102 session. For purposes of the embodiment of FIG. 6, it is assumed that SGW-U load balancer 138 selects SGW-U.3 132.3 to receive the DL data packet for the UE 102 session. At 642, SGW-U.2 132.2 decapsulates the GTP-U DL data and uses the UAT contained in the UAT IE to determine the ENB-U-FQTEID and the SGW-U-IN-FQTEID based on the UAT and the SSAK using operations as discussed for various embodiments described herein.

At 644, SGW-U.2 132.2 replaces the GTP-U source and destination information with the SGW-U-IN-FQTEID (source) and the ENB-U-FQTEID (destination) and re-encapsulates the DL data and any other information that may be applicable in a GTP-U packet and forwards the GTP-U DL data packet to eNB 104. The UAT IE is not included with the GTP-U DL data packet sent to the eNB 104. Upon receiving the GTP-U DL data packet, eNB 104 can process and forward the DL data to UE 102 at 646 as prescribed by 3GPP standards. Thus, as shown at 604-614 and 630-646, communication system 100 can facilitate UL and DL data-plane communications for a UE session using any SGW-U for an SGW-U data-plane pool in accordance with at least one embodiment for a deployment having an SGW-U load balancer. In particular, UL data and DL data for a UE session need not be handled by a same SGW-U for an SGW-U data-plane pool in accordance with various embodiments of communication system 100. In at least one embodiment, an SGW-U load balancer can offer advantages over non-load balancer solutions in terms of load distribution and failure handling among an SGW-U data plane pool.

Figure 7:
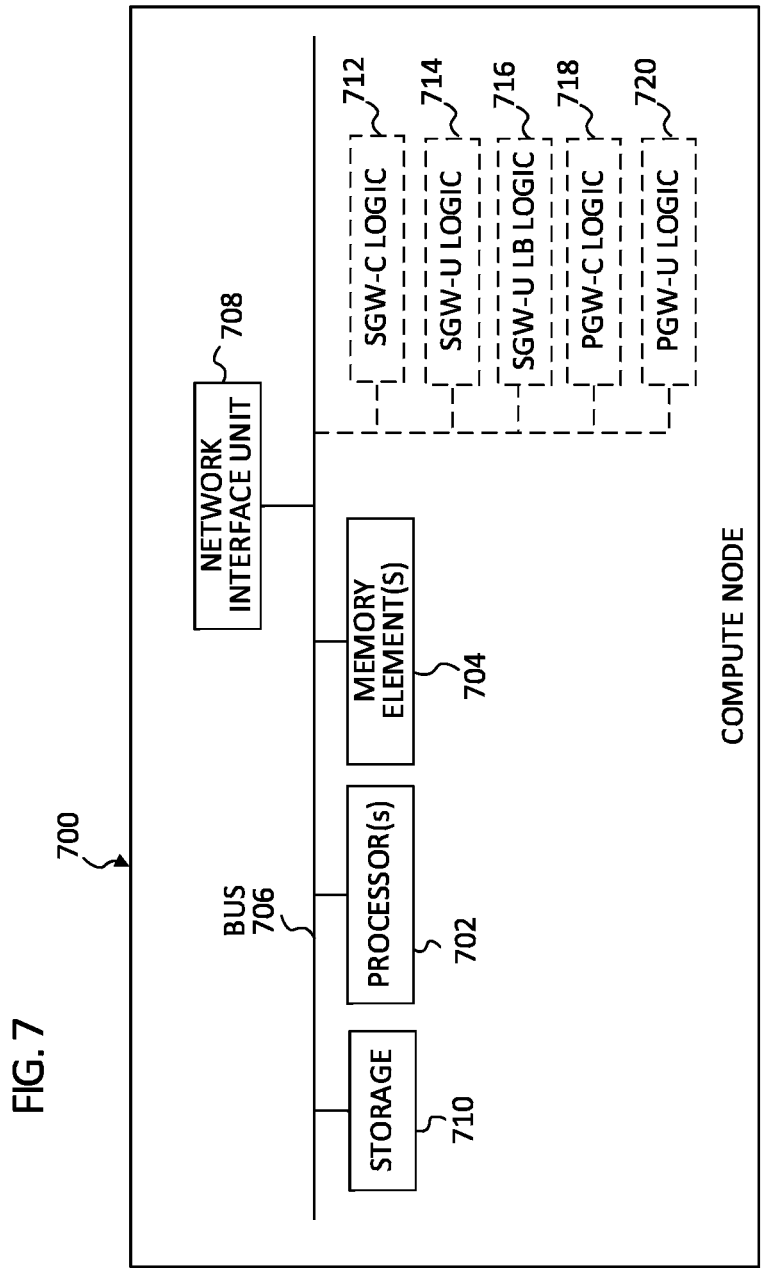
FIG. 7 is a simplified block diagram illustrating example details that can be associated a compute node in accordance with various potential embodiments discussed herein.

Referring to FIG. 7, FIG. 7 is a simplified block diagram illustrating example details that can be associated with a compute node 700 in accordance with various potential embodiments of communication system 100. The embodiment shown in FIG. 7 illustrates compute node 700, which includes at least one processor(s) 702, at least one memory element(s) 704, a bus 706, a network interface unit 708 and storage 710. In various embodiments, compute node 700 can be configured with instructions for various logic including, SGW-C logic 712, SGW-U logic 714, SGW-U load balancer (LB) logic 716, PGW-C logic 718 and/or PGW-U logic 720 depending on whether the compute node is configured to provide SGW-C operations, SGW-U operations, SGW-U load balancing operations, PGW-C operations, PGW-U operations, combinations thereof or any other control and/or data-plane operations, functionality, etc. that may be instantiated in an SDN architecture for communication system 100. In various embodiments, compute node 700 can be implemented: as a data center compute node such as a server, rack of servers, multiple racks of servers, etc. for a data center; as a cloud compute node, which can be distributed across one or more data centers; as combinations thereof or the like. In some embodiments, multiple compute nodes 700 can be configured to realize an SDN architecture that implements control- and data-plane operations for communication system 100. In various embodiments, processor(s) 702, memory element(s) 704, bus 706, network interface unit 708, storage 710 and logic, software, etc. configured for compute node 700 can represent hardware, software and/or network resources, which can be abstracted into virtualized functionality to perform control- and/or data-plane operations as discussed for various embodiments described herein.

In at least one embodiment, processor(s) 702 is/are at least one hardware processor configured to execute various tasks, operations and/or functions for compute node 700 as described herein according to software and/or instructions configured for compute node 700. In at least one embodiment, memory element(s) 704 is/are configured to store data, information, software and/or instructions associated with compute node 700 and logic configured for memory element(s) 704. In at least one embodiment, bus 706 can be configured as an interface that enables one or more elements of compute node 700 (e.g., network interface unit 708, processor(s) 702, memory element(s) 704, logic configured for compute node 700, etc.) to communicate in order to exchange information and/or data. In at least one embodiment, a fast kernel-hosted interconnect may be employed for compute node 700, potentially using shared memory between processes (e.g., logic), which can enable efficient communication paths between the processes.

In various embodiments, network interface unit 708 enables communication between compute node 700, other compute nodes, other network elements and/or nodes (e.g., eNB 104, target eNB 534 [as shown in FIG. 5], MME 112) and/or one or more PDN(s) (e.g., PDN(s) 140) to facilitate operations discussed for various embodiments described herein. In some embodiments, network interface unit 708 can be configured with one or more Ethernet driver(s), Fibre Channel driver(s) and/or controller(s) or other similar network interface driver(s) and/or controller(s) to enable communications for compute node 700 within communication system 100. In various embodiments storage 710 and/or memory element(s) 704 can be configured to store data, information, software and/or instructions associated with compute node 700 and/or logic configured for compute node 700.

In at least one embodiment in which compute node 700 is configured to provide SGW-C (e.g., SGW-C 122) functionality, compute node 700 can be configured with SGW-C logic 712. In various embodiments, SGW-C logic 712 can include instructions that, when executed (e.g., by processor(s) 702) cause compute node 700 to perform operations including, but not limited to: generating and/or sharing SSAK(s) with one or more SGW-U(s) of an SGW-U pool; allocating SGW-U-IN-FQTEID(s) and SGW-U-EG-FQTEID(s) for one or more UE session(s); allocating SGW-C-TUN-FQTEID(s) and SGW-U-TUN-FQTEID(s); generating UAT(s) for one or more UE session(s); notifying eNB(s) and PGW-C(s)/PGW-U(s) of UAT(s) for UE session(s); buffering and forwarding DL data for UE session(s); identifying UE session(s) for UE data to be forwarded; appending UE data with a UAT IE including the UAT for an identified UE session; forwarding UE data to tunnel endpoint(s); combinations thereof or any other operations as discussed for various embodiments described herein.

For embodiments in which compute node 700 is configured to provide SGW-C functionality, storage 710 and/or memory element(s) 704 can store: one or more SSAK(s); interface information (e.g., FQTEIDs, TEIDs, IP addresses; UE and/or subscriber IDs, etc.) for UE session(s) and/or other communications within communication system 100; one or more UAT(s) for one or more UE session(s); buffered DL data for UE session(s) (e.g., for IDLE and ACTIVE state transitions); cryptographic keys; masks; logic; any other data, information, software and/or instructions as discussed for various embodiments described herein (e.g., logic can be stored in memory element(s) 704 and/or storage 710); combinations thereof or the like. Note that in some embodiments, storage can be consolidated with memory elements (or vice versa), or can overlap/exist in any other suitable manner.

In at least one embodiment in which compute node 700 is configured to provide SGW-U (e.g., SGW-U.1-SGW-U.N 132.1-132.N) functionality, compute node 700 can be configured with SGW-U logic 714. In various embodiments, SGW-U logic 714 can include instructions that, when executed (e.g., by processor(s) 702) cause compute node 700 to perform operations including, but not limited to: using a UAT contained in a UAT IE for UE data and an SSAK to determine appropriate source and destination FQTEIDs for forwarding the data; identifying UL and DL packets; de-encapsulating and encapsulating data; sending DL data for a UE to the SGW-C in instances when a UE is in an IDLE state; forwarding UE data to an appropriate tunnel endpoint; combinations thereof or any other operations as discussed for various embodiments described herein.

For embodiments in which compute node 700 is configured to provide SGW-U functionality, storage 710 and/or memory element(s) 704 can store: one or more SSAK(s); interface information (e.g., FQTEIDs, TEIDs, IP addresses; UE and/or subscriber IDs, etc.) for communications within communication system 100; cryptographic keys; masks; logic; any other data, information, software and/or instructions as discussed for various embodiments described herein (e.g., logic can be stored in memory element(s) 704 and/or storage 710); combinations thereof or the like.

In at least one embodiment in which compute node 700 is configured to provide SGW-U load balancer (e.g., SGW-U load balancer 138) functionality, compute node 700 can be configured with SGW-U LB logic 716. In various embodiments, SGW-U LB logic 716 can include instructions that, when executed (e.g., by processor(s) 702) cause compute node 700 to perform operations including, but not limited to: maintaining a health status for one or more SGW-Us of an SGW-U data plane pool (e.g., SGW-U data plane pool 136); selecting an SGW-U to handle traffic for a UE session; forwarding data to a selected SGW-U; combinations thereof or any other operations as discussed for various embodiments described herein.

For embodiments in which compute node 700 is configured to provide SGW-U load balancer functionality, storage 710 and/or memory element(s) 704 can store: health status information; threshold information; interface information (e.g., FQTEIDs, TEIDs, IP addresses; UE and/or subscriber IDs, etc.) for communications within communication system 100; cryptographic keys; masks; logic; any other data, information, software and/or instructions as discussed for various embodiments described herein (e.g., logic can be stored in memory element(s) 704 and/or storage 710); combinations thereof or the like.

In at least one embodiment in which compute node 700 is configured to provide PGW-C (e.g., PGW-C 124) functionality, compute node 700 can be configured with PGW-C logic 718. In various embodiments, PGW-C logic 718 can include instructions that, when executed (e.g., by processor(s) 702) cause compute node 700 to perform operations including, but not limited to: allocating PGW-U-FQTEID(s) for one or more UE session(s); notifying PGW-U(s) of UAT(s) for one or more UE session(s); combinations thereof or any other operations as discussed for various embodiments described herein.

For embodiments in which compute node 700 is configured to provide PGW-C functionality, storage 710 and/or memory element(s) 704 can store: interface information (e.g., FQTEIDs, TEIDs, IP addresses; UE and/or subscriber IDs, etc.) for communications within communication system 100; logic; any other data, information, software and/or instructions as discussed for various embodiments described herein (e.g., logic can be stored in memory element(s) 704 and/or storage 710); combinations thereof or the like.

In at least one embodiment in which compute node 700 is configured to provide PGW-U (e.g., PGW-U 134) functionality, compute node 700 can be configured with PGW-U logic 720. In various embodiments, PGW-U logic 720 can include instructions that, when executed (e.g., by processor(s) 702) cause compute node 700 to perform operations including, but not limited to: associating respective UAT(s) to respective UE session(s); identifying UE session(s) for UE data to be forwarded; appending UE data with a UAT IE including the UAT for an identified UE session; forwarding UE data to tunnel endpoint(s); combinations thereof or any other operations as discussed for various embodiments described herein.

For embodiments in which compute node 700 is configured to provide PGW-U functionality, storage 710 and/or memory element(s) 704 can store: interface information (e.g., FQTEIDs, TEIDs, IP addresses; UE and/or subscriber IDs, etc.) for communications within communication system 100; UAT association(s) for UE session(s); logic; any other data, information, software and/or instructions as discussed for various embodiments described herein (e.g., logic can be stored in memory element(s) 704 and/or storage 710); combinations thereof or the like.

In regards to the internal structure associated with communication system 100, each of respective UE 102, eNB 104, target eNB 534 [as shown in FIG. 5], and MME 112 can also include respective at least one processor(s), respective at least one memory element(s), respective at least one storage, a respective network interface unit, respective logic, combinations thereof or the like to facilitate stateless SGW-U operations in a network environment. Hence, appropriate software, hardware and/or algorithms are being provisioned for communication system 100 in order to facilitate operations as discussed for various embodiments described herein to facilitate stateless SGW-U operations in a network environment.

In various example implementations, UE 102, eNB 104, target eNB 534 [as shown in FIG. 5], MME 112 and one or more compute node(s) 700 [as shown in FIG. 7 to facilitate SGW-C, SGW-U, SGW-U load balancer, PGW-C and/or PGW-U functionality] discussed for various embodiments described herein can encompass network appliances, routers, servers, switches, gateways, bridges, loadbalancers, firewalls, processors, modules, radio receivers/transmitters or any other suitable device, component, element, or object operable to exchange information that facilitates or otherwise helps to facilitate various operations as described for various embodiments discussed herein in a network environment (e.g., for networks such as those illustrated in FIG. 1). In various embodiments, one or more of UE 102, eNB 104, target eNB 534 [as shown in FIG. 5], MME 112 and/or one or more compute node(s) 700 [as shown in FIG. 7 to facilitate SGW-C, SGW-U, SGW-U load balancer, PGW-C and/or PGW-U functionality] discussed herein can include software (or reciprocating software) that can coordinate in order to achieve operations associated with providing stateless SGW-U operations in a network environment as discussed herein and may include any suitable algorithms, hardware, software, components, modules, logic, clients, interfaces, and/or objects that facilitate the operations thereof. This may be inclusive of appropriate algorithms, communication protocols, interfaces and/or standards, proprietary and/or non-proprietary that allow for the effective exchange of data or information.

In various embodiments, UE 102, eNB 104, target eNB 534 [as shown in FIG. 5], MME 112 and/or one or more compute node(s) 700 [as shown in FIG. 7 to facilitate SGW-C, SGW-U, SGW-U load balancer, PGW-C and/or PGW-U functionality] discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'. Information being tracked or sent to one or more of UE 102, eNB 104, target eNB 534 [as shown in FIG. 5], MME 112 and/or one or more compute node(s) 700 [as shown in FIG. 7 to facilitate SGW-C, SGW-U, SGW-U load balancer, PGW-C and/or PGW-U functionality] discussed herein could be provided in any database, register, control list, cache, storage and/or storage structure: all of which can be referenced at any suitable timeframe. Any such storage options may also be included within the broad term 'memory element' as used herein. Any of potential processing elements, controllers, managers, logic and/or machines described herein can be construed as being encompassed within the broad term 'processor'. In various embodiments, each of UE 102, eNB 104, target eNB 534 (as shown in FIG. 5], MME 112 and/or one or more compute node(s) 700 [as shown in FIG. 7 to facilitate SGW-C, SGW-U, SGW-U load balancer, PGW-C and/or PGW-U functionality] discussed herein can also include suitable interfaces for receiving, transmitting, and/or otherwise communicating data or information in a network environment.

Note that in certain example implementations, operations as outlined herein to facilitate stateless SGW-U operations network environment may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, a memory element and/or storage [as shown in FIG. 7] can store data, software, code, instructions (e.g., processor instructions), logic, parameters, combinations thereof or the like used for operations described herein. This includes memory elements and/or storage being able to store data, software, code, instructions (e.g., processor instructions), logic, parameters, combinations thereof or the like that are executed to carry out operations described herein. A processor (e.g., a hardware processor) can execute any type of instructions associated with data to achieve the operations detailed herein. In one example, a processor [as shown in FIG. 7] can transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and/or one or more the elements identified herein could be some type of a programmable processor, programmable digital logic (e.g., a field programmable gate array (FPGA), a DSP processor, an EPROM, a controller, an electrically erasable PROM (EEPROM) or an ASIC that includes digital logic, software, code, electronic instructions, or any suitable combination thereof.

Note that in this Specification, references to various features (e.g., elements, structures, nodes, modules, components, logic, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein this Specification, can be inclusive of an executable file comprising instructions that can be understood and processed on by a computer, processor, machine, compute node, combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the communication system 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of' and 'one or more of can be represented using the'(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 may be applicable to other exchanges or routing protocols, interfaces and/or communications standards, proprietary and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
sharing an access key from a control-plane serving gateway (SGW-C) to a plurality of stateless user-plane serving gateways (SGW-Us) in a data plane;
during an establishment of a call for a user equipment (UE), allocating, at the control-plane serving gateway, a plurality of Fully Qualified Tunnel Endpoint Identifiers (FQTEIDs) associated with a UE session;
generating concatenated pairs of source and destination FQTEIDs using the plurality of FQTEIDs;
generating a bit sequence by combining the concatenated pairs of source and destination FQTEIDs of the plurality of FQTEIDS;
generating, at the control-plane serving gateway, an access token for the UE session based at least on the access key and the plurality of FQTEIDs and by masking or encrypting the bit sequence using the shared key to generate the access token;
communicating the access token for the UE session from the control-plane serving gateway to a radio node to which the UE is connected; and
appending, at the radio node, the access token to user-plane packets for the UE session.

2. The method of claim 1, further comprising:
receiving an uplink packet for the UE session by a particular SGW-U, wherein the uplink packet is appended with the access token for the UE session;
determining an SGW-U egress FQTEID and a user-plane packet data network gateway (PGW-U) FQTEID for the uplink packet based on the access token; and
routing the uplink packet toward the PGW-U FQTEID from the particular SGW-U.

3. The method of claim 1, further comprising:
receiving a downlink packet for the UE session by a particular SGW-U, wherein the downlink packet is appended with the access token for the UE session;
determining an SGW-U ingress FQTEID and a radio node FQTEID for the downlink packet based on the access token; and
routing the downlink packet toward the radio node FQTEID from the particular SGW-U.

4. The method of claim 1, further comprising:
communicating the access token for the UE session from the SGW-C to a control-plane packet data network gateway (PGW-C).

5. The method of claim 1, wherein generating the access token for the UE session further comprises:
concatenating each of the plurality of FQTEIDs in a predefined sequence to generate the bit sequence; and
masking or encrypting the bit sequence to generate the access token.

6. The method of claim 1, wherein allocating the plurality of FQTEIDs for the UE session further comprises:
allocating, by the SGW-C, a SGW-U ingress FQTEID and a SGW-U egress FQTEID for the UE session;
allocating, by a control-plane packet data network gateway (PGW-C), a user-plane packet data network gateway FQTEID; and
allocating, by the radio node to which the UE is connected, a radio node FQTEID.

7. One or more non-transitory tangible media encoding logic that includes instructions for execution by a processor, wherein the execution causes the processor to perform operations comprising:
sharing an access key from a control-plane serving gateway (SGW-C) to a plurality of stateless user-plane serving gateways (SGW-Us) in a data plane;
during an establishment of a call for a user equipment (UE), allocating, at the control-plane serving gateway, a plurality of Fully Qualified Tunnel Endpoint Identifiers (FQTEIDs) associated with a UE session;
generating concatenated pairs of source and destination FQTEIDs using the plurality of FQTEIDs;
generating a bit sequence by combining the concatenated pairs of source and destination FQTEIDs of the plurality of FQTEIDS;
generating, at the control-plane serving gateway, an access token for the UE session based at least on the access key and the plurality of FQTEIDs and by masking or encrypting the bit sequence using the shared key to generate the access token;
communicating the access token for the UE session from the control-plane serving gateway to a radio node to which the UE is connected; and
appending, at the radio node, the access token to user-plane packets for the UE session.

8. The media of claim 7, wherein the execution causes the processor to perform further operations, comprising:
receiving an uplink packet for the UE session by a particular SGW-U, wherein the uplink packet is appended with the access token for the UE session;
determining an SGW-U egress FQTEID and a user-plane packet data network gateway (PGW-U) FQTEID for the uplink packet based on the access token; and
routing the uplink packet toward the PGW-U FQTEID from the particular SGW-U.

9. The media of claim 7, wherein the execution causes the processor to perform further operations, comprising:
receiving a downlink packet for the UE session by a particular SGW-U, wherein the downlink packet is appended with the access token for the UE session;
determining an SGW-U ingress FQTEID and a radio node FQTEID for the downlink packet based on the access token; and
routing the downlink packet toward the radio node FQTEID from the particular SGW-U.

10. The media of claim 7, wherein the execution causes the processor to perform further operations, comprising:
communicating the access token for the UE session from the SGW-C to a control-plane packet data network gateway (PGW-C).

11. The media of claim 7, wherein generating the access token for the UE session further comprises:
concatenating each of the plurality of FQTEIDs in a predefined sequence to generate the bit sequence; and
masking or encrypting the bit sequence to generate the access token.

12. The media of claim 7, wherein allocating the plurality of FQTEIDs for the UE session further comprises:
allocating, by the SGW-C, a SGW-U ingress FQTEID and a SGW-U egress FQTEID for the UE session;
allocating, by a control-plane packet data network gateway (PGW-C), a user-plane packet data network gateway FQTEID; and
allocating, by the radio node to which the UE is connected, a radio node FQTEID.

13. A system comprising:
at least one memory element for storing data;
at least one network interface unit; and
at least one processor for executing instructions associated with the data, wherein the executing causes the system to perform operations, comprising:
sharing an access key from a control-plane serving gateway (SGW-C) to a plurality of stateless user-plane serving gateways (SGW-Us) in a data plane;
during an establishment of a call for a user equipment (UE), allocating, at the control-plane serving gateway, a plurality of Fully Qualified Tunnel Endpoint Identifiers (FQTEIDs) associated with a UE session;
generating concatenated pairs of source and destination FQTEIDs using the plurality of FQTEIDs;
generating a bit sequence by combining the concatenated pairs of source and destination FQTEIDs of the plurality of FQTEIDS;
generating, at the control-plane serving gateway, an access token for the UE session based at least on the access key and the plurality of FQTEIDs and by masking or encrypting the bit sequence using the shared key to generate the access token;
communicating the access token for the UE session from the control-plane serving gateway to a radio node to which the UE is connected; and
appending, at the radio node, the access token to user-plane packets for the UE session.

14. The system of claim 13, wherein the executing causes the system to perform further operations, comprising:
receiving an uplink packet for the UE session by a particular SGW-U, wherein the uplink packet is appended with the access token for the UE session;
determining an SGW-U egress FQTEID and a user-plane packet data network gateway (PGW-U) FQTEID for the uplink packet based on the access token; and
routing the uplink packet toward the PGW-U FQTEID from the particular SGW-U.

15. The system of claim 13, wherein the executing causes the system to perform further operations, comprising:
- receiving a downlink packet for the UE session by a particular SGW-U, wherein the downlink packet is appended with the access token for the UE session;
- determining an SGW-U ingress FQTEID and a radio node FQTEID for the downlink packet based on the access token; and
- routing the downlink packet toward the radio node FQTEID from the particular SGW-U.

16. The system of claim 13, wherein the executing causes the system to perform further operations, comprising:
- communicating the access token for the UE session from the SGW-C to a control-plane packet data network gateway (PGW-C).

* * * * *

UNITED STATES PATENT AND TRADEMARK OFFICE
CERTIFICATE OF CORRECTION

PATENT NO. : 10,356,830 B2
APPLICATION NO. : 15/408179
DATED : July 16, 2019
INVENTOR(S) : Paras Mal Jain et al.

It is certified that error appears in the above-identified patent and that said Letters Patent is hereby corrected as shown below:

On the Title Page

Page 2, in Column 2, under "Other Publications", Line 5, delete "10439411" and insert -- 10493411 --, therefor.

In the Specification

In Column 27, Line 63, delete "of" and insert -- of --, therefor.

In Column 27, Line 64, delete "the` (s)'" and insert -- the '(s)' --, therefor.

In the Claims

In Column 28, Line 48, in Claim 1, delete "FQTEIDS;" and insert -- FQTEIDs; --, therefor.

In Column 29, Line 45, in Claim 7, delete "FQTEIDS;" and insert -- FQTEIDs; --, therefor.

In Column 30, Line 47, in Claim 13, delete "FQTEIDS;" and insert -- FQTEIDs; --, therefor.

Signed and Sealed this
First Day of October, 2019

Andrei Iancu
*Director of the United States Patent and Trademark Office*